United States Patent
Itakura

(10) Patent No.: US 6,934,961 B2
(45) Date of Patent: Aug. 23, 2005

(54) DAMPER AND VIBRATION PROOF STRUCTURE FOR MECHANICAL CHASSIS

(75) Inventor: Masayuki Itakura, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 101 days.

(21) Appl. No.: 10/316,153

(22) Filed: Dec. 11, 2002

(65) Prior Publication Data

US 2003/0112735 A1 Jun. 19, 2003

(30) Foreign Application Priority Data

Dec. 14, 2001 (JP) .................................. 2001-382269
Jun. 27, 2002 (JP) .................................. 2002-187808

(51) Int. Cl.$^7$ .............................................. G11B 25/04
(52) U.S. Cl. .................................................... 720/692
(58) Field of Search .......................... 369/263; 720/651, 720/688, 692, 693, 694

(56) References Cited

U.S. PATENT DOCUMENTS

| | | | |
|---|---|---|---|
| 4,731,777 A | | 3/1988 | Yoshitoshi et al. |
| 4,922,478 A | * | 5/1990 | Verhagen ..................... 369/247 |
| 4,985,884 A | * | 1/1991 | Watanabe et al. ........... 369/263 |
| 6,392,982 B1 | * | 5/2002 | Kobayashi et al. .......... 369/263 |
| 6,439,551 B1 | * | 8/2002 | Kato ........................... 267/113 |
| 6,603,728 B1 | * | 8/2003 | Hopf et al. .................. 369/263 |
| 2001/0040859 A1 | * | 11/2001 | Nguyen et al. .............. 369/263 |

FOREIGN PATENT DOCUMENTS

| | | |
|---|---|---|
| JP | 59155637 | 9/1984 |
| JP | 07037375 | 2/1995 |
| JP | 07208534 | 8/1995 |
| JP | 09282859 | 10/1997 |

OTHER PUBLICATIONS

European Search Report.

* cited by examiner

Primary Examiner—A. J. Heinz
Assistant Examiner—Mark Blouin
(74) Attorney, Agent, or Firm—Rader, Fishman & Grauer PLLC

(57) ABSTRACT

A damper has a flexible portion formed of a rubber-like elastic material, such as thermoplastic elastomer, and a lid portion whose inner peripheral portion is formed of the rubber-like elastic material. The flexible portion and the lid portion are respectively equipped with mounting recesses into which mounting shaft members oppositely arranged on a casing of a reproduction device are inserted to hold the damper. With this construction, there is no need to mount the damper such that the lid portion faces the side plate or the bottom plate of the casing. Therefore, it is possible to reduce the thickness of the reproduction device, and to increase the degree of freedom in the design of the casing. Further, since the damper is supported in a floating state, it is possible to obtain a superior vibration damping effect whether the device is installed in a vertical or horizontal position.

26 Claims, 13 Drawing Sheets

DAMPER AND VIBRATION PROOF STRUCTURE FOR MECHANICAL CHASSIS

BACKGROUND OF THE INVENTION

1. Field of the Invention

The present invention relates to a technique for supporting in a vibration proof manner the mechanical chassis of a reproduction device equipped with a reading mechanism for reading data in a non-contact manner from a disc-like recording medium, such as a CD, CD-ROM, CD-RW, DVD, DVD-ROM/RAM, or a magneto-optical disc device, for use in audio apparatus, video apparatus, information apparatus, various types of precision apparatus, and so forth, including automotive and commercial uses.

2. Description of the Related Art

In reproduction devices for disc-like recording media as mentioned above (hereinafter referred to as disc), there is a trend toward increasing the rotation speed when performing data reading. This also applies to reproduction devices of the type capable of data writing. Thus, it is a constant challenge to damp vibration of the reproduction device transmitted from outside (hereinafter referred to as external vibration), rotation vibration of the eccentric disc, and vibration generated by the driving mechanisms, such as the disc rotating motor and pickup (hereinafter referred to as internal vibration). Due to the non-contact type reading/writing system, such external vibration and internal vibration have a significantly bad effect on the reading accuracy and writing accuracy.

As indispensable vibration damping means for solving this problem, a vibration proof structure as shown in FIGS. 11A through 13B is known, in which dampers 5, 6 are provided between a casing 2 of a reproduction device 1 and a mechanical chassis 4 for driving a disc 3 for reproduction, the mechanical chassis 4 being elastically supported in a vibration proof manner.

One of the typical dampers used in such a vibration proof structure is an insulation-type damper, as shown in FIG. 11B. This damper 5 is formed of a rubber-like elastic material in a substantially cylindrical configuration. In its outer peripheral surface, there is formed a mounting groove 5a to be engaged with a mounting portion 4a of the mechanical chassis 4.

Another typical damper is one with viscous fluid sealed in, as shown in FIG. 12A. This damper 6 comprises a cylindrical peripheral wall portion 6a formed of a hard resin, such as polypropylene, a flexible portion 6b closing the opening at one end thereof and formed of a rubber-like elastic material such as thermoplastic elastomer, a lid portion 6c closing the opening at the other end and formed of a hard resin such as polypropylene, and a liquid viscous fluid 6d consisting of silicone oil or the like sealed in the internal space defined by the peripheral wall portion 6a, the flexible portion 6b, and the lid portion 6c. The damper 6 can be used in conjunction with coil springs S, as shown in FIGS. 13A and 13B.

In the former insulator type damper 5, it is difficult to set the spring constant so as to satisfy the requisite vibration control performance for the reproduction device 1, in which there is a marked increase in the rotation speed of the disc, so that a sufficient vibration damping effect is not to be expected. In view of this, the latter type of damper 6 with sealed-in viscous fluid, which is superior in damping effect, is frequently used. This, however, has the following problems.

As shown, for example, in FIG. 13A, in the condition in which the reproduction device 1 is placed in the horizontal position, the damper 6 is mounted so as to face a side plate 2a extending in the transverse direction (thickness direction) y of the structure member of the reproduction device 1, i.e., the casing 2. The damper 6 has in the lid portion 6c a mounting portion including a hole 6e for passing a screw N for fixing the damper to the side plate 2a. Thus, the thickness t2 of the entire reproduction device including the height t1 of the side plate 2a is considerably large. If the reproduction device is further reduced in thickness, the mounting of the damper 6 becomes impossible. Thus, with the prevention of vibration for the mechanical chassis 4 by using this damper 6, there is a limitation to a further reduction in the thickness of the reproduction device 1, with the distance L necessary in terms of the mechanism of the reproduction device 1 being secured between the disc 3 and the top plate of the casing 2.

In the case in which, as shown in FIG. 13B, the lid portion 6c is mounted to the structure member of the reproduction device 1 placed horizontally, i.e., in the case in which the damper 6 is mounted so as to face the bottom plate 2b extending along the longitudinal direction x of the casing 2, even when the same distance L is secured between the disc 3 and the top plate of the casing 2, the total thickness t3 of the reproduction device 1 can be made somewhat smaller than the total thickness t2 in FIG. 13A. However, this is still insufficient to meet the requirement for a further reduction in size, and there is a demand for a damper different from the damper 6, and a vibration proof structure for the mechanical chassis 4, which can meet the requirement for a further reduction in the thickness of the reproduction device 1.

Further, in both the mounting structures for the damper 6 shown in FIGS. 13A and 13B, the lid portion 6c is mounted so as to face the side plate 2a or the bottom plate 2b of the casing 2, so that it is necessary to secure the requisite mounting area for the flat lid portion 6c in the side plate 2a and the bottom plate 2b. Thus, there can be a limitation to the configuration of the side plate 2a and the bottom plate 2b. For example, the bead for the reinforcement of the casing 2 cannot be formed, or there is a limitation to the mounting positions for other parts to be mounted to the side plate 2a and the bottom plate 2b.

These problems also apply to a so-called air damper in which, instead of using the liquid viscous fluid 6d as the damping medium, air holes are formed in the peripheral wall portion 6a and the lid portion 6c, and a damping effect is obtained from the air flowing through the air holes.

SUMMARY OF THE INVENTION

The present invention has been made in view of the above problems in the prior art. It is an object of the present invention to provide a novel damper and a mounting structure for the damper, which are capable of meeting a further reduction in the thickness in the transverse direction (thickness direction) of a reproduction device.

Further, the present invention aims to provide a novel damper and a mounting structure for the damper, which are capable of providing a superior vibration damping effect whether a reproduction device whose casing is reduced in thickness in the transverse direction (thickness direction) is used in the vertical or the horizontal position.

Further, the present invention aims to provide a damper and a mounting structure for the damper, which allow an increase in the degree of freedom in designing the casing of a reproduction device.

In order to achieve the above-mentioned objects, there is provided a damper characterized in that each of a flexible portion and a lid portion is equipped with one of a mounting protrusion and a protrusion receiving portion into which a mounting protrusion is inserted, forming a fixation structure with respect to the structure member each of them faces, and that the container main body is equipped with a mounting means with respect to the mechanical chassis.

Unlike the conventional damper, this damper need not be mounted so as to face the side plate or the bottom plate of the casing. In this damper, the flexible portion and the lid portion thereof are provided with either mounting protrusions or protrusion receiving portions into which a mounting protrusion is inserted, which forms a fixed structure with respect to the structure members facing them, so that the flexible portion and the lid portion are fixed to structure members of the reproduction device facing them by means of the mounting protrusions and protrusion receiving portions, whereby the damper is supported in a floating state with respect to the casing of the reproduction device and a structure member such as a bracket mounted to the casing. In this floating state, the damper is fixed to the mechanical chassis by a mounting means provided on the container main body to thereby damp vibration of the mechanical chassis. In this way, there is no need to mount the damper with its lid portion facing the casing as in the prior art, so that it is possible to meet the requirement for a further reduction in the dimension in the transverse direction (thickness direction) as compared with the conventional dampers. Further, the degree of freedom in the design of the casing can be increased. Since the damper is fixed to the mechanical chassis while supported in a floating state with respect to the structure member, it can provide a superior vibration damping effect whether the reproduction device is used in the vertical or the horizontal state.

More specifically, the damper having mounting protrusions or protrusion receiving portions in the flexible portion and the lid portion are of the following types:

[1] The flexible portion is equipped with a recessed inner peripheral surface into which a mounting protrusion provided on the structure member of the reproduction device can be inserted, and there is provided a protrusion receiving portion whose forward end enters the container main body toward the lid portion. In the case in which such a protrusion receiving portion is provided in the flexible portion, it is possible to obtain a vibration damping effect due to the agitating action of the viscous fluid, such as silicone oil, sealed in the container main body as the damping medium.

[2] The flexible portion is equipped with a mounting protrusion to be inserted into a protrusion receiving portion provided in the structure member. When such a mounting protrusion is provided on the flexible portion, the total height of the damper excluding the mounting protrusion can be further reduced as compared with the damper with the flexible portion of the above type [1]. In addition, since there is no protrusion receiving portion entering the container main body, it is possible to increase the amount of damping medium consisting of a viscous fluid, such as silicone oil, so that it is possible to obtain a further enhanced vibration damping effect.

[3] The lid portion is equipped with a protrusion receiving portion having a recessed inner peripheral surface into which a mounting protrusion provided on a structure member of the reproduction device can be inserted. By providing such a protrusion receiving portion in the lid portion, it is possible to reliably fix the lid portion to the structure member. To make the fixation in this case more reliable, the protrusion receiving portion is formed so as to outwardly protrude from the lid portion. Then, it is possible to secure an insertion depth for the mounting protrusion corresponding to the protruding amount, making it possible to prevent detachment. To further enhance the detachment preventing effect, there is provided on the recessed inner peripheral surface of the protrusion receiving portion a lock surface portion locking an outwardly directed lock protrusion formed on the mounting protrusion in the detachment direction.

[4] The lid portion is equipped with a mounting protrusion protruding from the container main body, which is to be inserted into a protrusion receiving portion provided in a structure member. By providing such a mounting protrusion on the lid portion, the lid portion can be reliably fixed to the structure member.

Further, of the peripheral wall portion, the flexible portion, and the lid portion of the container main body of the damper, it is possible, for example, to form the peripheral wall portion and the flexible portion as an integral unit of the same material, and to form the lid portion alone as a separate member. Conversely, it is also possible to form the peripheral wall portion and the lid portion as an integral unit, and to form the flexible portion alone as a separate member. Of course, they may also be formed as separate members of the same or different materials.

The damper, to further enhance the vibration damping effect, is desirably structured such that the central portion of the lid portion, including the mounting protrusion or protrusion receiving portion forming portion, is formed of a rubber-like elastic material.

In this arrangement, not only the flexible portion but also the central portion of the lid portion formed of a rubber-like elastic material functions to damp vibration as an elastic membrane, so that the damping effect is further enhanced. Further, when inserting the mounting protrusion into the protrusion receiving portion, it is possible to deform, in addition to the flexible portion, the central portion thereof, so that the operation of inserting the mounting protrusion into the protrusion receiving portion can be easily conducted.

The means for fixing the damper to the mechanical chassis may be chemical means such as adhesive, mechanical means such as a screw, or structural means such as engagement or fitting. In any case, it is desirable that the mounting operation be conducted quickly and easily.

In a mode of the present invention, the container main body may be provided with a lock protrusion as a mounting means to lock the plate surface of the mechanical chassis. More specifically, there is provided, for example, on at least the peripheral wall portion or the lid portion an outwardly directed flange-like lock protrusion. A mounting hole having an inner edge of a configuration corresponding to the peripheral wall portion of the container main body is formed, for example, in the mechanical chassis, and the peripheral wall portion is inserted into this mounting hole to abut the lock protrusion against the mechanical chassis. Thus, solely by the operation of inserting and abutting, the damper can be fixed to the mechanical chassis.

To make the fixation by the lock protrusion more reliable, it is possible to simultaneously use chemical means, such as adhesive, or mechanical means as mentioned above in conducting locking through the lock protrusion. However, to realize a reliable fixation with a still simpler construction, it is also possible to provide the container main body with a lock member as a mounting means which locks the other surface of the mechanical chassis on the opposite side of one surface thereof that the lock protrusion locks so that the mechanical chassis may be held on the front and back sides by the lock protrusion and the lock member.

Further, if the damper is fixed to the mechanical chassis, the damper would be inclined to rotate within the mounting hole of the mechanical chassis upon receiving vibration, resulting in an unstable mounting condition. In such a case, the container main body may be provided with a detent protrusion for locking from the thickness direction of the mechanical chassis.

In addition to the damper described above, the present invention newly provides, as a means for achieving the above object, a vibration proof structure for a mechanical chassis in which a damper is used which has a container main body consisting of a cylindrical peripheral wall portion, a flexible portion for closing an opening at one end of the peripheral wall portion which is formed of a rubber-like elastic material, and a lid portion for closing an opening at the other end of the peripheral wall portion, and which contains in the interior space of the container main body a damping medium for damping vibration by viscosity resistance generated from flowage. The damper is mounted to a mechanical chassis equipped with a reading mechanism for reading data retained in a disc-like recording medium by a non-contact system and to a structure member of a reproduction device separate from the mechanical chassis, wherein vibration of the mechanical chassis is damped by the damper. That is, the vibration proof structure is characterized in that, the flexible portion and the lid portion of the damper are fixed to a structure member to support the damper in a floating state, and the damper is mounted in an overlapping relationship with the thickness of the mechanical chassis.

In this vibration proof structure, the flexible portion and the lid portion of the damper are respectively fixed to the structure member to support the damper in a floating state, so that, as in the case of the above-described damper, there is no need to mount the damper such that its lid portion faces the side plate or the bottom plate of the casing as in the case of the conventional damper, so that it can meet the requirement for a further reduction in the dimension of the reproduction device in the transverse direction (thickness direction) thereof, and it is possible to increase the degree of freedom in designing the casing. Further, since the damper is fixed to the mechanical chassis while supported in a floating state with respect to the structure member, it is possible to obtain a superior vibration damping effect whether the reproduction device is used in the vertical or the horizontal position. Specifically, the fixation of the flexible portion and the lid portion to the structure member is effected by fixing the flexible portion of the damper and the structure member to each other by a mounting protrusion provided on one of them and a protrusion receiving portion provided in the other of them, and by fixing the lid portion of the damper and the structure member to each other by a mounting protrusion provided on one of them and a protrusion receiving portion provided in the other of them.

Further, in the above vibration proof structure, the damper is mounted in an overlapping relationship with the thickness of the mechanical chassis, which also helps to meet the requirement for a further reduction in the thickness of the reproduction device. Specifically, in performing this mounting, the peripheral wall portion of the damper is inserted into a mounting hole formed in the mechanical chassis, and the damper is mounted in an overlapping relationship with the thickness of the mechanical chassis.

Further, to fix the damper to the mechanical chassis in the above vibration proof structure, as in the case of the above-described damper, an outwardly directed lock protrusion is provided on the container main body of the damper, and this lock protrusion is engaged with the hole edge of the mounting hole of the mechanical chassis to thereby mount the damper to the mechanical chassis. To make this fixation more reliable, the container main body is provided with a lock member for locking the other surface of the mechanical chassis on the side opposite to one surface thereof that the lock protrusion locks, the mechanical chassis being held on the front and back sides thereof.

Even when the damper has been fixed to the mechanical chassis, the damper would be inclined to turn within the mounting hole of the mechanical chassis upon receiving vibration, resulting in an unstable mounting state. In such a case, a cutout portion enlarging the hole edge may be provided in the mounting hole of the mechanical chassis, and a detent protrusion for circumferentially effecting locking with respect to the cutout portion may be provided on the container main body. Further, a through-hole may be provided in the mechanical chassis, and the container main body may be provided with a detent protrusion for effecting locking from the thickness direction of the mechanical chassis with respect to the through-hole.

The damper used in the vibration proof structure for a mechanical chassis of the present invention may be the damper of the present invention described above, or a damper of the type in which a viscous fluid is sealed in the container main body as the damping medium, or a so-called air damper which uses air instead of a viscous fluid as the damping medium.

The present invention is not restricted to what has been described above. The objects, advantages, features, and uses of the present invention will become more apparent from the following description made with reference to the accompanying drawings. Further, it is to be understood that all modifications not departing front the gist of the present invention fall within the scope of the invention.

BRIEF DESCRIPTION OF THE DRAWINGS

The present invention will become more clearly appreciated as the disclosure of the invention is made with reference to the accompanying drawings. In the drawings:

FIGS. 1A and 1B are explanatory diagrams showing a damper according to a first embodiment of the present invention, in which FIG. 1A is a sectional view taken along the line SB—SB of FIG. 1B, and FIG. 1B is a bottom view of FIG. 1A;

FIGS. 2A and 2B are explanatory diagrams showing how the damper of FIGS. 1A and 1B is mounted, in which FIG. 2A is an explanatory view of the internal structure of a reproduction device, showing how the damper is mounted, and FIG. 2B is an explanatory view as seen from the direction of the line SC—SC of FIG. 2A, showing how the damper is mounted;

FIGS. 3A and 3B are explanatory diagrams showing dampers according to other embodiments of the present invention, in which FIG. 3A is a sectional view equivalent to FIG. 1A, showing a damper according to a second embodiment of the present invention, and FIG. 3B is a sectional view equivalent to FIG. 1A, showing a damper according to a third embodiment of the present invention;

FIGS. 4A and 4B are explanatory diagrams showing a damper according to a fourth embodiment of the present invention and a mounting structure for the same, in which FIG. 4A is a half section taken along the line SD—SD of FIG. 4B and equivalent to FIG. 1A, and FIG. 4B is an explanatory diagram equivalent to FIG. 2B, showing how the damper is mounted;

FIGS. 5A and 5B are explanatory diagrams showing a damper according to a fifth embodiment of the present invention and a mounting structure for the same, in which FIG. 5A is a sectional view taken along the line SE—SE of FIG. 5B and showing the mounting structure, and FIG. 5B is an explanatory diagram equivalent to FIG. 2B, showing how the damper is mounted;

FIGS. 6A and 6B are explanatory diagrams showing a damper according to a modification of the fifth embodiment of the present invention and a mounting structure for the same, in which FIG. 6A is a sectional view taken along the line SF—SF of FIG. 6B and showing the mounting structure, and FIG. 6B is an explanatory diagram equivalent to FIG. 2B, showing how the damper is mounted;

FIGS. 7A and 7B are explanatory diagrams showing a damper according to a sixth embodiment of the present invention and a mounting structure for the same, in which FIG. 7A is a sectional view taken along the line SG—SG of FIG. 7B and showing the mounting structure, and FIG. 7B is an explanatory diagram equivalent to FIG. 2B, showing how the damper is mounted;

FIGS. 8A and 8B are explanatory diagrams showing a damper according to a seventh embodiment of the present invention and a mounting structure for the same, in which FIG. 8A is a sectional view taken along the line SH—SH of FIG. 8B and showing the mounting structure, and FIG. 8B is an explanatory diagram as seen from the bottom side of the damper, showing how the damper is mounted;

FIGS. 9A and 9B are explanatory diagrams showing a damper according to an eighth embodiment of the present invention and a mounting structure for the same, in which FIG. 9A is a sectional view taken along the line SI—SI of FIG. 9B and showing the mounting structure, and FIG. 9B is an explanatory diagram as seen from the bottom side of the damper, showing how the damper is mounted;

FIGS. 10A and 10B are explanatory diagrams showing a damper according to a ninth embodiment of the present invention and a mounting structure for the same, in which FIG. 10A is a sectional view taken along the line SJ—SJ of FIG. 10B and showing the mounting structure, and FIG. 10B is an explanatory diagram as seen from the bottom side of the damper, showing how the damper is mounted;

FIGS. 11A and 11B are explanatory diagrams showing a conventional damper, in which FIG. 11A is an explanatory view of the internal structure of a reproduction device, showing how the damper is mounted, and FIG. 11B is a half section of the damper;

FIGS. 12A and 12B are explanatory diagrams showing another conventional damper, in which FIG. 12A is a sectional view taken along the line SA—SA of FIG. 12B, and FIG. 12B is a plan view of FIG. 12A; and FIGS. 13A and 13B are explanatory diagrams showing how the damper shown in FIGS. 12A and 12B is mounted, in which FIG. 13A is an explanatory view of the internal structure of a reproduction device, showing an example of a damper mounting structure, and FIG. 13B is an explanatory view of the internal structure of a reproduction device, showing another example of a damper mounting structure.

DETAILED DESCRIPTION OF THE PREFERRED EMBODIMENTS

Figure 1A:
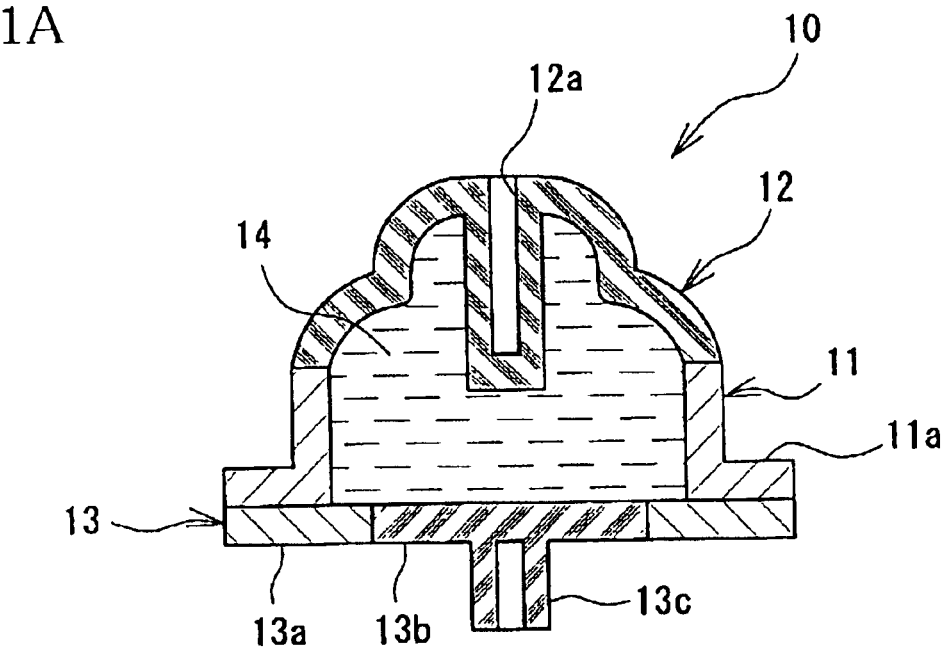
Figure 1B:
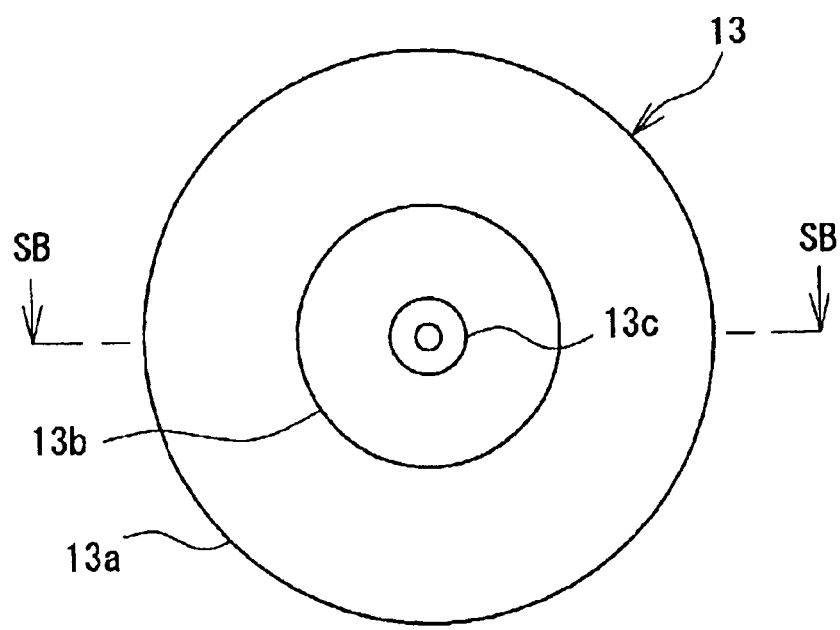

Embodiments of the damper of the present invention and embodiments of the mounting structure thereof, that is, the vibration proof structure for a mechanical chassis, will now be described with reference to FIGS. 1A through 10B of the drawings. In the description of the embodiments, the components which are common to the various embodiments are indicated by the same reference numerals, and an overlapping description will be omitted.

First Embodiment

Description of the Damper

A damper 10 according to a first embodiment of the present invention is shown in FIGS. 1A through 2B. The damper 10 comprises a cylindrical peripheral wall portion 11, a flexible portion 12 for closing an opening at one end of the peripheral wall portion 11 which is formed of a rubber-like elastic material, a lid portion 13 closing an opening at the other end, and a liquid viscous fluid 14 as the damping medium. The peripheral wall portion 11, the flexible portion 12, and the lid portion 13 constitute the "container main body."

The cylindrical peripheral wall portion 11 has an outwardly directed flange 11a formed as a "lock protrusion" constituting a "mounting means." The outwardly directed flange 11a is fastened to the lid portion 13 by ultrasonic welding. Alternatively, it may be fastened by adhesive.

Formed in the flexible portion 12 so as to extend from the central summit portion thereof toward the lid portion 13 is a mounting recess 12a into which a mounting shaft member 2c (See FIGS. 2A and 2B) protruding from a casing 2 as the "structure member" of a reproduction device 1 is inserted and retained therein. Thus, in this embodiment, the mounting recess 12a constitutes the "protrusion receiving portion" of the flexible portion 12, and the mounting shaft member 2c constitutes the "mounting protrusion." A fixed structure is formed by inserting the mounting shaft member 2c into the mounting recess 12a.

The lid portion 13 is formed in two portions of different colors: an outer peripheral portion 13a and an inner peripheral portion 13b. The outer peripheral portion 13a is formed of hard resin, and is fastened by ultrasonic welding to the peripheral wall portion 11 similarly formed of hard resin. The inner peripheral portion 13b is formed of a rubber-like elastic material, and an outwardly directed mounting recess 13c protrudes from the central portion thereof A mounting shaft member 2d protruding from the casing 2 is inserted into the mounting recess 13c to thereby hold the same. Thus, in this embodiment, the mounting recess 13c constitutes the "protrusion receiving portion" of the lid portion 13, and the mounting shaft member 2d constitutes the "mounting protrusion," a fixed structure being formed by inserting the mounting shaft member 2d into the mounting recess 13c.

The mounting recess 12a of the flexible portion 12 and the mounting recess 13c of the lid portion 13 are formed such that their cylinder axes are positioned coaxially with the cylinder axis of the peripheral wall portion 11.

Examples of materials of the members of the damper 10, constructed as described above, will now be described.

It is preferable for the peripheral wall portion 11 and the outer peripheral portion 13a of the lid portion 13 to be formed of a material with rigidity; in view of the requisite performances, such as dimensional accuracy, heat resistance, mechanical strength, durability, and reliability, they may be formed of thermoplastic resin, thermosetting resin, metal or the like. Examples of the thermoplastic resin include polyethylene resin, polypropylene resin, polyvinyl chloride resin, polystyrene resin, acrylonitrile-styrene-acrylate resin, acrylonitrile-butadiene-styrene resin, polyamide resin, polyacetal resin, polycarbonate resin, polyethylene terephthalate resin, polybutylene terephthalate resin, polyphenylene oxide resin, polyphenylene sulfide resin, polyurethane resin, polyphenylene ether resin, denatured polyphenylene ether resin, silicone resin, polyketone resin, and liquid crystal polymer, and a composite material thereof Examples of the thermosetting resin include phenol resin, epoxy resin, silicone resin, polyurethane, melamine resin, unsaturated polyester resin, and a composite material thereof.

The rubber-like elastic members constituting the flexible portion 12 and the inner peripheral portion 13b of the lid portion 13 are members formed of a material exhibiting rubber elasticity. To meet the required performance of the damper 10, the material preferably has high durability and high damping property and low creeping property. Specifically, regarding durability, a suitable rubber pulling property is not less than 2 MPa, and more preferably, not less than 4 MPa. Regarding the damping property, it is desirable to adopt a high damping material having a loss factor tan δ of not less than 0.05 (25° C.), and more preferably, not less than 0.2. When the loss factor tan δ is not more than 0.05, the amplitude of the mechanical chassis 4 at the time of resonance is large, and there is the danger of the mechanical chassis 4 coming into contact with the casing 2 and other internal components. Regarding the creeping property, it is preferably low and exhibits a compression set (70° C., 22h) of not more than 50%, and more preferably, not more than 30%. When the compression set is not less than 50%, the displacement amount of the mechanical chassis 4 after being left for a long period of time becomes large, and there is the danger of the mechanical chassis coming into contact with the casing 2 and other internal components.

Specifically, the rubber-like elastic material can be selected from thermoplastic elastomer, cross-link rubber or the like according to the required performances, such as dimensional accuracy, heat resistance, mechanical strength, durability, reliability, vibration control property, and damping property. Examples of the thermoplastic elastomer include styrene-based thermoplastic elastomer, olefin type thermoplastic elastomer, polyester type thermoplastic elastomer, polyurethane type thermoplastic elastomer, polyamide type thermoplastic elastomer; and vinyl chloride type thermoplastic elastomer. Examples of the cross-link rubber include natural rubber, butadiene rubber, isoprene rubber, styrene-butadiene copolymerization rubber, nitrile rubber, hydrogenation nitrile rubber, chloroprene rubber, ethylene propylene rubber, chlorinated polyethylene, chlorosulfonated polyethylene, butyl rubber and halogenation butyl rubber, acrylic rubber, fluoro rubber, urethane rubber, and silicone rubber.

As the viscous fluid 14, it is possible to use, for example, silicone oil with solid particles not reacting with and not soluble in silicone oil dispersed therein according to the required performances, such as heat resistance, reliability, vibration control property, and damping property. Examples of the silicone oil include dimethyl silicone oil, methyl phenyl silicone oil, methyl hydrogen silicone oil, and fluorine denatured silicone oil. Regarding the solid particles, there is no particular restriction as long as they do not react with and are not dissolved in silicone oil. Examples of the solid particles include silicon resin powder, polymethyl sill sesquioxan powder, wet silica grain, dry silica grain, glass beads, glass balloons, and surface-treated products thereof. It is possible to use only one of these substances or use several of them in combination.

Description of the Mounting Structure

Figure 2A:
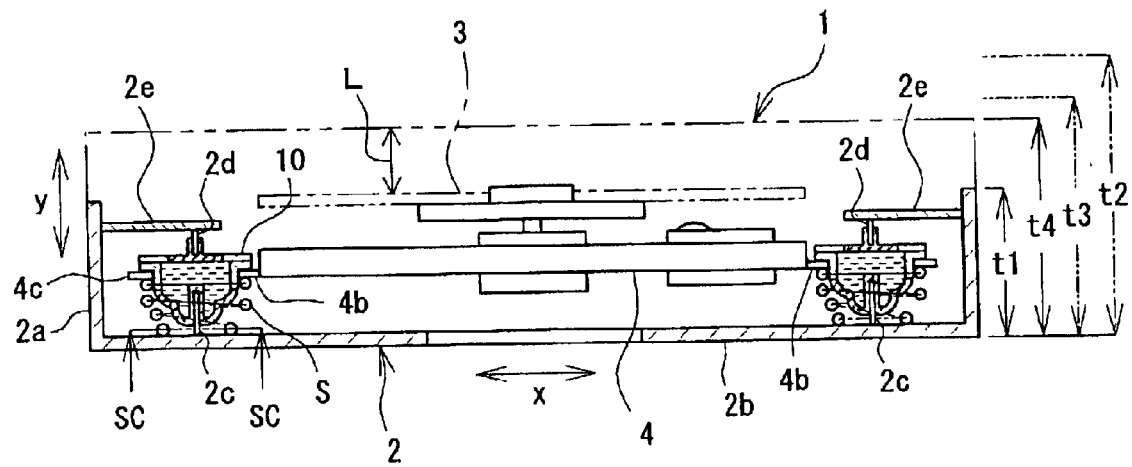
Figure 2B:
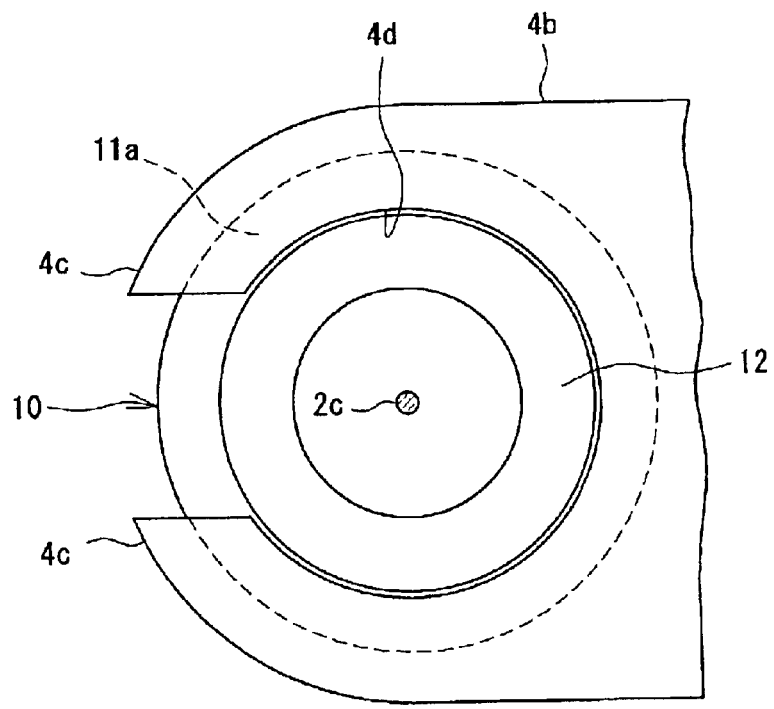

Next, the mounting structure for the above damper 10 and a vibration proof structure for a mechanical chassis will be described. As shown in FIG. 2A, brackets 2e as the "structure members" for mounting the dampers 10 are fixed to the side plates 2a of the casing 2 constituting the "structure member" of this embodiment. A mounting shaft member 2d protrudes from each-bracket 2e. The bottom plate 2b constituting the "structure member" of this embodiment also has mounting shaft members 2c protruding therefrom. These mounting shaft members 2c and 2d are provided so as to extend along the same axis, with their forward end portions being spaced apart from each other. Further, the mechanical chassis 4 has mounting portions 4b for the dampers 10. Each mounting portion 4b of this embodiment has a hoe-shaped lock member 4c as shown in FIG. 2B, and the inner edge of the lock member 4c forms a mounting hole 4d.

The damper 10 is inserted into the mounting hole 4d of the lock member 4c of the mechanical chassis 4 to secure the damper 10 to the mechanical chassis 4. Since the inner diameter of the mounting hole 4d is smaller than the outer diameter of the peripheral wall portion 11 of the damper 10, the insertion (forcing-in) of the damper 10 causes the lock member 4c to be outwardly enlarged. When the outwardly directed flange 11a (lock protrusion) of the peripheral wall portion 11 of the damper 10 abuts the plate surface of the lock member 4c for locking, the outwardly directed flange 11a is fixed to the lock member 4c through the intermediation of adhesive (not shown). In addition to the fixation by adhesive, the damper 10 is also retained by the holding force due to the tightening of the lock member 4c outwardly enlarged by the peripheral wall portion 11. Thus, even when it continuously receives vibration, the damper 10 is not easily detached from the mechanical chassis 4. While in this example adhesive is used to enhance the reliability in the fixation of the outwardly directed flange 11a to the lock member 4c, it is not absolutely necessary to use adhesive, and the adhesive can therefore be omitted.

When the damper 10 has been thus mounted to the mechanical chassis 4, the mounting shaft member 2c of the casing 2 is inserted into the mounting recess 12a of the flexible portion 12 of the damper 10, and the mounting shaft member 2d of the bracket 2e is inserted into the mounting recess 13c of the lid portion 13. As a result, the mounting shaft members 2c and 2d are held by the mounting recesses 12a and 13c, and the damper 10 is mounted to the reproduction device 1. While in this example the mechanical chassis 4 is elastically supported by coil springs S, it is also possible to use a sponge material or the like instead of the coil springs S.

Illustration of the Effects

The damper 10 and the vibration proof mechanism for a mechanical chassis described above provide the following effects.

Unlike the conventional damper 6 mounted such that its lid portion 6c is attached to the inner wall (side plate 2a) of the casing 2 (See FIG. 13A), the damper 10 is fixed to the casing 2 by inserting the mounting shaft members 2c and 2d into the mounting recesses 12a and 13a. That is, the damper 10 is supported in a floating state inside the casing 2, and the mechanical chassis 4 mounted to the damper 10 is also supported in a floating state inside the casing 2. Thus, the thickness of the damper 10 and the thickness of the mechanical chassis 4 overlap each other in the height direction (transverse direction y), so that it is possible to meet the requirement for a further reduction in the thickness in the transverse direction y of the casing 2. That is, as shown in FIG. 2A, the total thickness t4 of the reproduction device 1 of this embodiment can be made still smaller than the total thickness t2, t3, of the conventional reproduction device 1.

Further, both the flexible portion 12 and the inner peripheral portion 13b of the lid portion 13 are formed of a rubber-like elastic material, and the damper 10 is supported in a floating state. Therefore, when the reproduction device 1 is installed horizontally as in FIG. 2A or when the reproduction device 1 is installed vertically, even if the mechanical chassis 4 is displaced in either the vertical direction or the horizontal direction, either the flexible portion 12 or the lid portion 13 (inner peripheral portion 13b) always undergoes elastic deformation and acts so as to damp vibration. As a result, it is possible to substantially damp internal vibration of the mechanical chassis 4 and external vibration applied to the mechanical chassis 4.

Further, since the lid portion 13 is not fixed so as to face the casing 2, it is possible to form reinforcing beads in the form of protrusions and recesses on the bottom plate portion 2b and set the portion around the mounting shaft member 2c as a mounting place for other components. This makes it possible to increase the degree of freedom in the design of the casing 2. Further, since it is possible to abolish use of the screw or the like for fixing the damper 10, it is possible to reduce the number of mounting parts.

When inserting the mounting shaft member 2d into the mounting recess 13c of the damper 10, it is possible to effect mounting to the mounting shaft member 2d by denting the entire inner peripheral portion 13b toward the interior of the damper 10. This is possible because not only the mounting recess 13c but also the inner peripheral portion 13b including the central portion of the lid portion 13 is formed of a rubber-like elastic material, thus facilitating the mounting operation.

Since the mounting recess 13c of the lid portion 13 is in the form of a protrusion, it is possible for the insertion depth for the mounting shaft member 2d to be large, whereby the detachment preventing effect for the mounting shaft member 2d is enhanced.

Second Embodiment

Figure 3A:
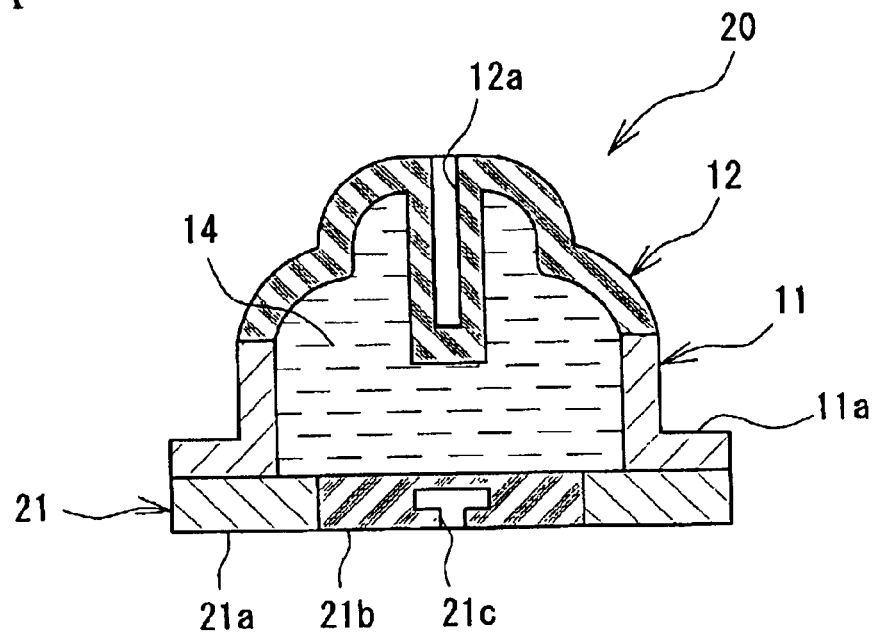

A damper 20 according to a second embodiment will now be described with reference to FIG. 3A of the drawings. The damper 20 differs from the damper 10 of the first embodiment in the construction of the lid portion 21. Otherwise, the construction and the mounting structure thereof are the same.

The lid portion 21 consists of two parts of different colors: an annular outer peripheral portion 21a formed of hard resin and an inner peripheral portion 21b formed of a rubber-like elastic material. The inner peripheral portion 21b has within its thickness a mounting recess 21c. This mounting recess 21c is formed in a configuration relative to a mounting shaft member (not shown) consisting of a large diameter disc-like head portion and a small diameter cylindrical shaft portion formed thereon.

Thus, in this damper 20, in which the mounting recess 21c is embedded and does not protrude from the lid portion 21, it is possible to meet the requirement for a further reduction in the thickness of the reproduction device. Further, the mounting recess 21c has an orthogonal surface engaging with the disc-like head portion of the mounting shaft member (not shown) in the detachment direction, so that it is possible to further enhance the detachment preventing effect for the mounting shaft member.

Third Embodiment

Figure 3B:
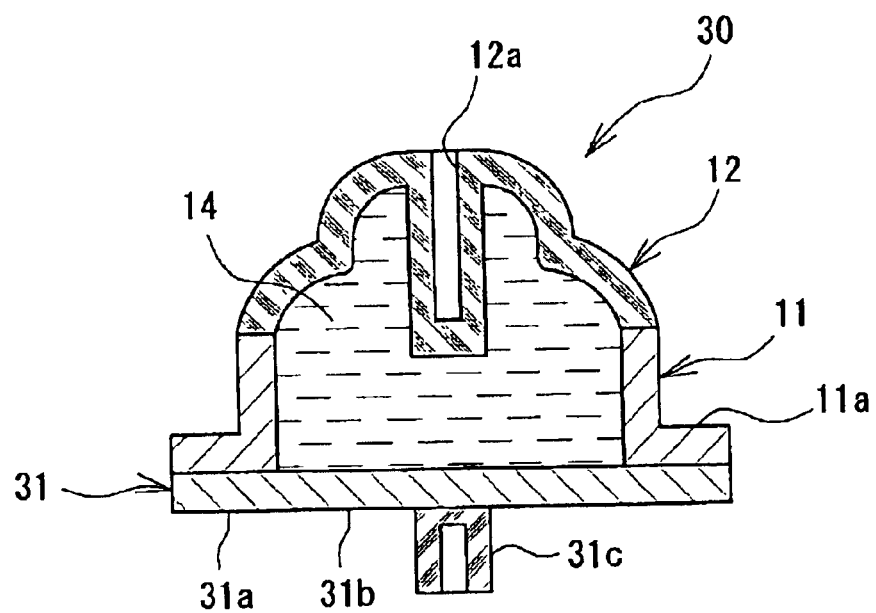

A damper 30 according to a third embodiment of the present invention will now be described with reference to FIG. 3B of the drawings. The damper 30 differs from the damper 10 of the first embodiment in the construction of the lid portion 31. Otherwise, the construction and the mounting structure thereof are the same.

The lid portion 31 of the damper 30 consists of a disc-like lid main body 31a formed of hard resin, and a mounting recess 31c formed of a rubber-like elastic material is firmly-attached to the outer side surface 31b thereof. The attachment of the mounting recess 31c may be effected by adhesive or thermal fusion based on two-color molding. Thus, in this damper 30, it is possible to obtain the same effect as that of the first embodiment corresponding thereto in construction solely by fixing the mounting recess 31c to the lid main body 31a.

Fourth Embodiment

Figure 4A:
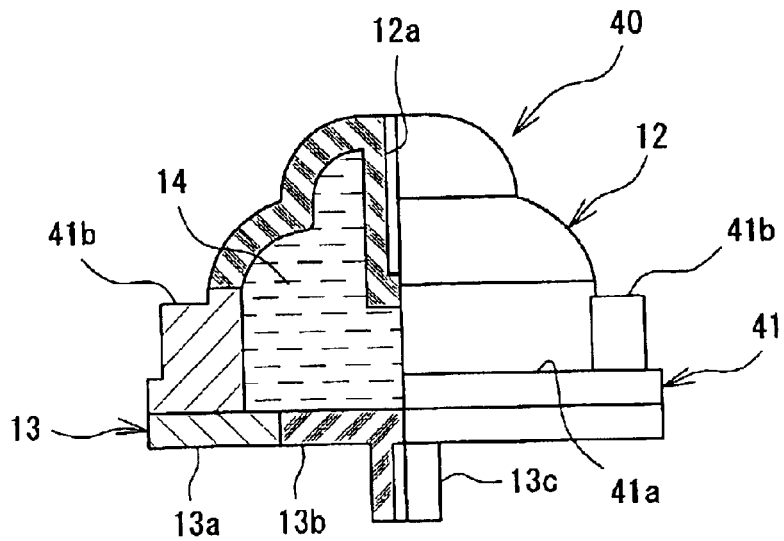
Figure 4B:
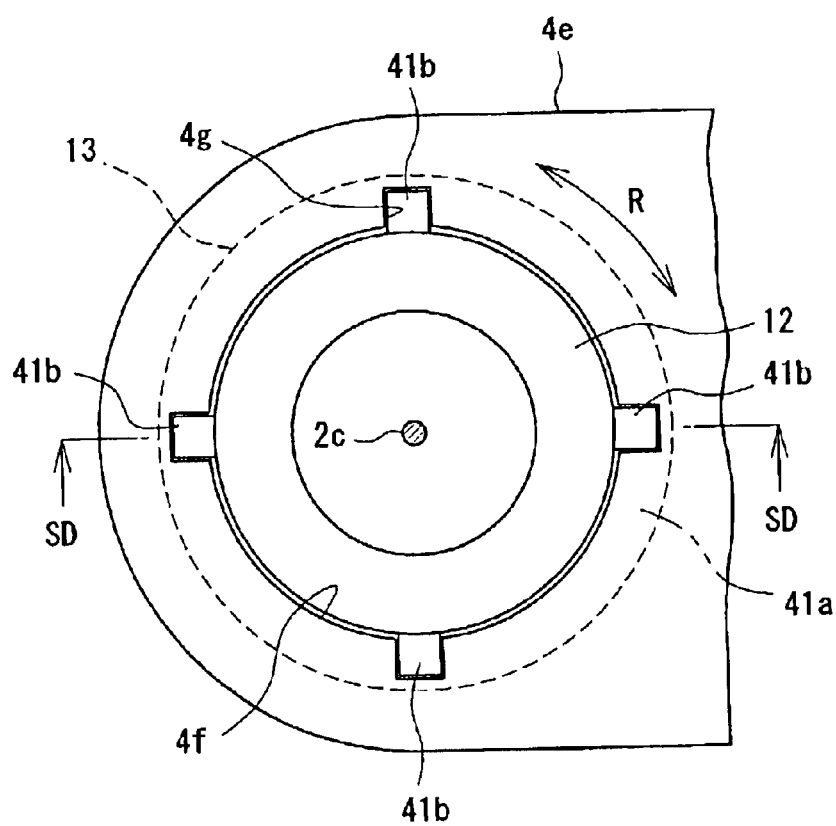

A damper 40 according to a fourth embodiment will now be described with reference to FIGS. 4A and 4B of the drawings. The damper 40 differs from the damper 10 of the first embodiment in the construction of the peripheral wall portion 41 and the mounting structure thereof. The damper 40 has an outwardly directed flange 41a as the "lock protrusion" of a peripheral wall portion 41, and has four detent protrusions 41b formed around the cylinder axis of the peripheral wall portion 41. There is no limitation regarding the number of detent protrusions 41b. A mounting portion 4e of the mechanical chassis 4 to which this damper 40 is fixed has a mounting hole 4f of a configuration having substantially the same shape as that of the peripheral wall portion 41 of the damper 40. This mounting hole 4f has cutout portions 4g enlarging the inner edge. The detent protrusions 41b enter these cutout portions 4g. Thus, in the damper 40 and the mounting structure thereof, if the damper 40 is inclined to rotate within the inner edge of the mounting hole 4f upon receiving external vibration or internal vibration; the detent protrusions 41b abut the cutout portions 4g in the rotating direction R from the thickness direction of the mechanical chassis 4, so that rotation is hindered, and it is possible to maintain the initial mounting state in a stable manner.

Fifth Embodiment

Figure 5A:
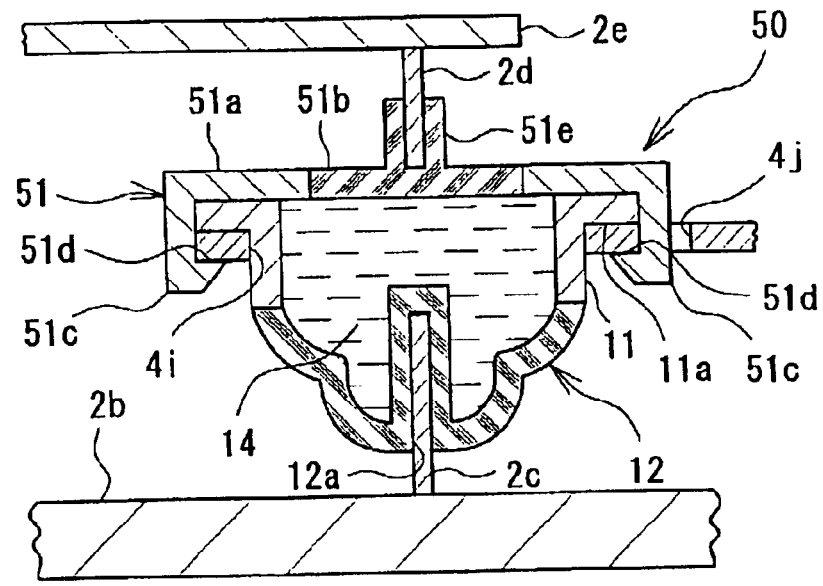
Figure 5B:
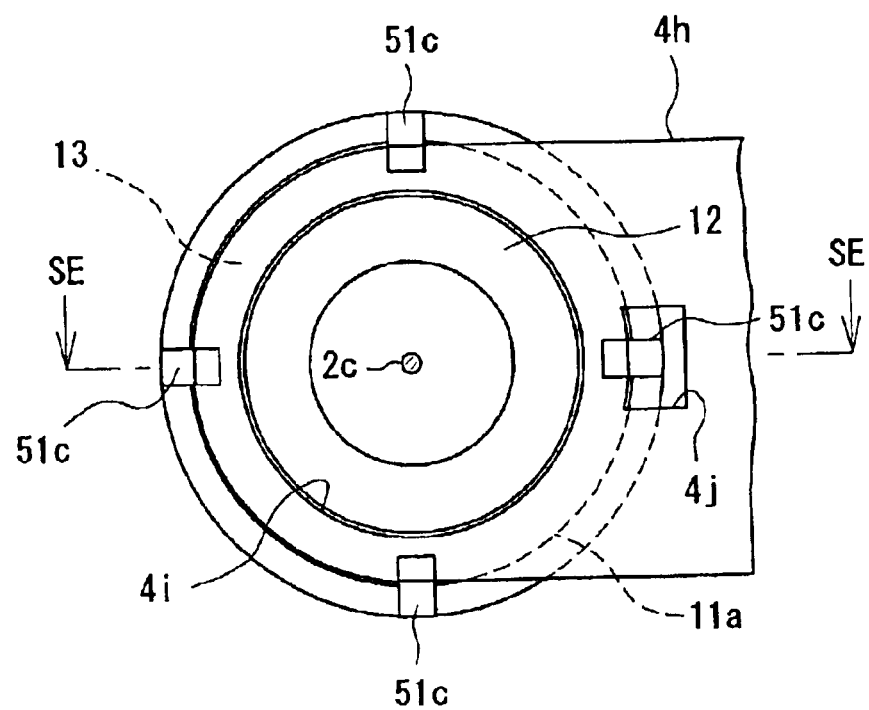

A damper 50 according to a fifth embodiment of the present invention will now be described with reference to FIGS. 5A and 5B of the drawings. The damper 50 differs from the damper 10 of the first embodiment in the construction of the lid portion 51 and the mounting structure thereof.

The lid portion 51 of this damper 50 also consists of two parts of different colors: an outer peripheral portion 51a formed of hard resin, and an inner peripheral portion 51b formed of a rubber-like elastic material. Of these, the outer peripheral portion 51a has four lock members 51c. There is no limitation regarding the number of lock members 51c. The lock members 51c are in a column-like configuration and are adapted to extend from one side of the mechanical chassis 4 to the other side thereof to lock the other side. The lock members 51c have at their forward ends lock claws 51d protruding inwardly. Further, the inner peripheral portion 51b has a recess 51e constituting a "protrusion receiving portion."

A mounting portion 4h of the mechanical chassis 4 to which the damper 50 is mounted has a mounting hole 4i having a diameter substantially equal to the outer diameter of the peripheral wall portion 11 of the damper 50, and a substantially rectangular through-hole 4j through which one of the lock members 51c is passed.

To mount the damper 50 to the mounting portion 4h, the damper 50 is inserted into the mounting hole 4i, and one of the lock members 51c is first passed through the through-hole 4j. The damper 50 is thus forced in as it is. By this forcing-in, the lock members 51c are outwardly deflected, and the mounting portion 4h is held between the lock claws 51d and the outwardly directed flange 11a (lock protrusion) of the peripheral wall portion 11, whereby the damper 50 is fixed to the mechanical chassis 4.

Thus, in the damper 50 and the mounting structure thereof, the mounting of the damper 50 can be effected quickly and easily through the one-touch operation of forcing in the damper 50, thereby markedly improving the mounting operability. Further, since the lock claws 51d of the lock members 51c are inwardly directed, the mounting portion 4h does not stick out of the damper 50 in the mounting region for the damper 50. Thus, the space in the casing 2 occupied by the mounting portion 4h is advantageously small. Further, the lock member 51c passed through the through-hole 4j also functions as a detent protrusion for locking the through-hole 4j from the thickness direction of the mechanical chassis 4, so that even if vibration is applied, rotation of the damper 50 is restrained. While FIGS. 5A and 5B showing this embodiment show no coil spring, it is possible to mount a coil spring S in some other place in the casing 2.

Figure 6A:
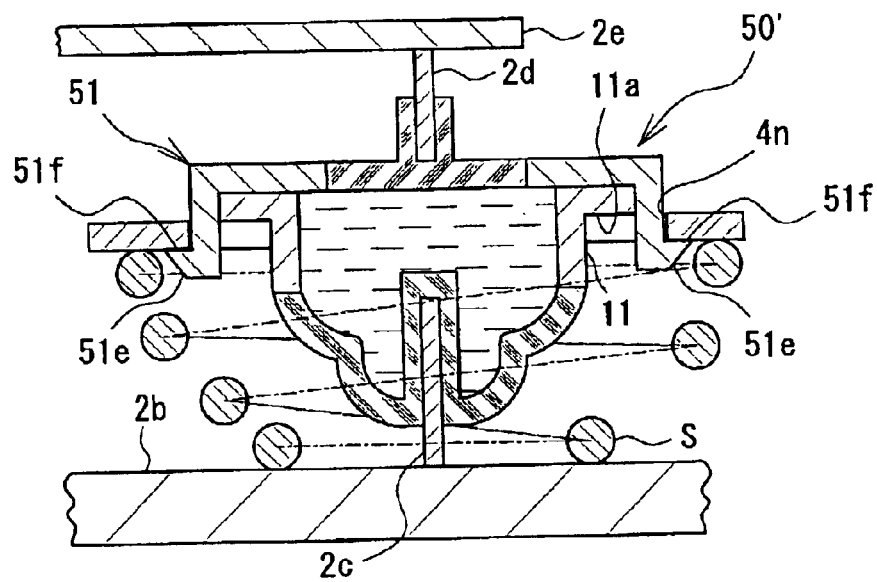
Figure 6B:
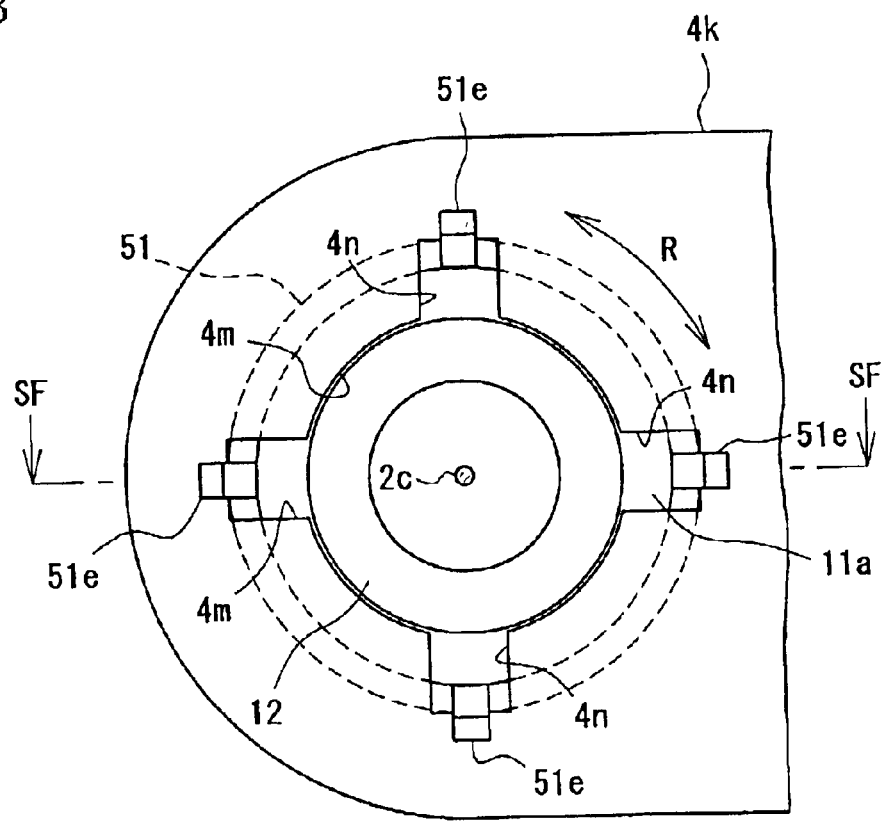

While the lock claws 51d of the lock members 51c provided on the lid portion 51 of the damper 50 are inwardly directed, it is also possible to create a modified damper 50', as shown in FIGS. 6A and 6B. The modified damper 50' has lock claws 51f with lock members 51e that are outwardly directed. In this case, a mounting portion 4k of the mechanical chassis 4 has cutout portions 4n enlarging a mounting hole 4m, and the lock claws 51f are hooked thereon. Then, the damper 50' comes to hold the mechanical chassis 4 between the lock claws 51f and the outwardly directed flange 11a (lock protrusion) of the peripheral wall portion 11, thereby effecting fixation. Thus, in the damper 50' and the mounting structure thereof, the damper 50' can be mounted by a one-touch operation. Further, due to the locking of the lock claws 51f with respect to the cutout portions 4n, it is possible to restrain rotation of the damper 50' in the rotating direction R upon receiving vibration.

Sixth Embodiment

Figure 7A:
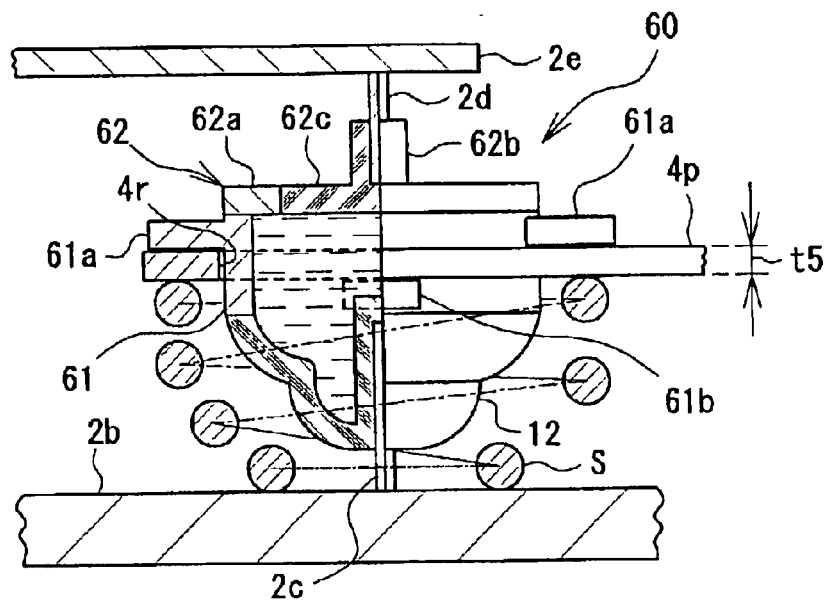
Figure 7B:
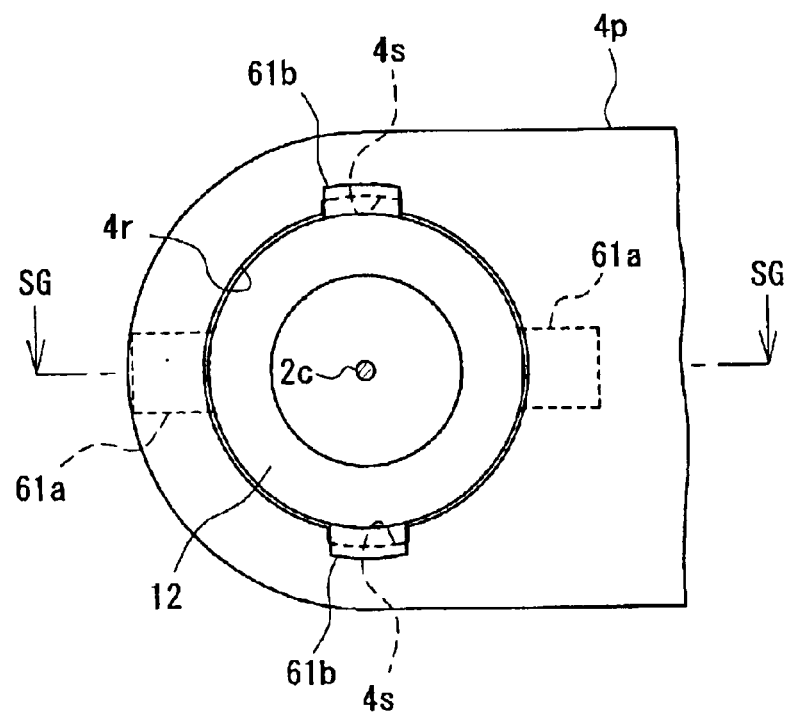

A damper 60 according to a sixth embodiment of the present invention will now be described with reference to FIGS. 7A and 7B of the drawings. The damper 60 differs from those of the above embodiments in both the peripheral wall portion 61 and the lid portion 62.

The peripheral wall portion 61 of the damper 60 has, at upper and lower positions with respect to the cylinder axis direction thereof, two lock protrusions 61a and two lock members 61b spaced apart from each other by a distance corresponding to the thickness t5 of a mounting portion 4p of the mechanical chassis 4. Due to this arrangement, the mechanical chassis 4 can be mounted at the substantially central position with respect to the height direction of the damper 60 (the cylinder axis direction of the peripheral wall portion 61), so that it is possible to restrain the amount of protrusion of the damper 60 from the front and back sides of the mechanical chassis 4. Thus, it is applicable to a reproduction device 1 further reduced in thickness. The mounting portion 4p of the mechanical chassis 4 has cutout portions 4s enlarging the mounting hole 4r, and the lock members 61b also functioning as detent protrusions are locked there.

The lid portion 62 is formed by two-color molding so as to consist of an outer peripheral portion 62a and an inner peripheral portion 62c having a mounting recess 62b. Since the outer diameter of the outer peripheral portion 62a is equal to the diameter of the peripheral wall portion 61, it is possible to further reduce the space in the reproduction device 1 occupied by the damper 60. In this embodiment, there is no limitation regarding the number of lock protrusions 61a and the number of lock members 61b.

Seventh Embodiment

Figure 8A:
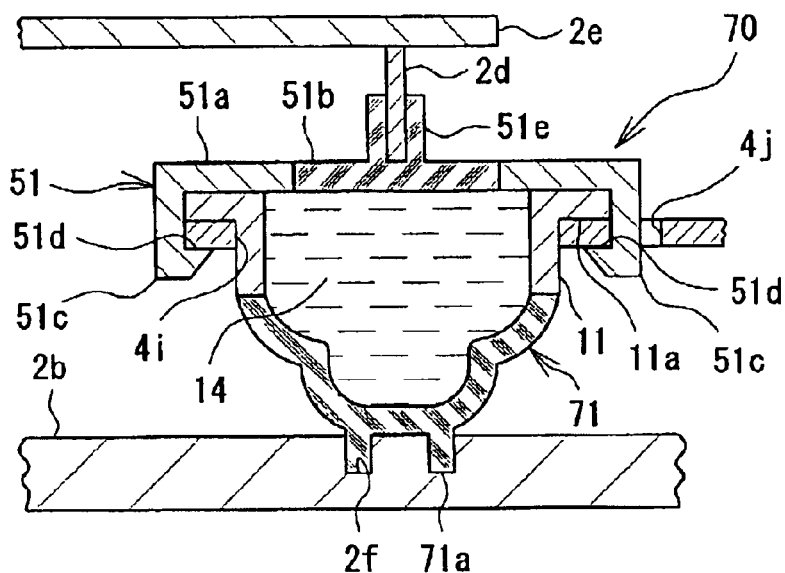
Figure 8B:
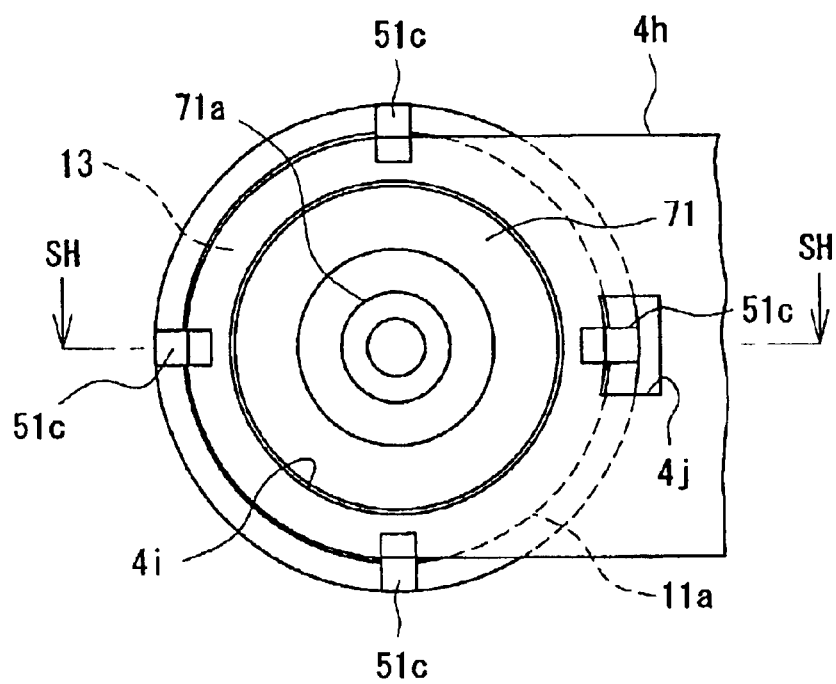

A damper 70 according to a seventh embodiment of the present invention will now be described with reference to FIGS. 8A and 8B of the drawings. In the damper 70, the flexible portion 12 of the damper 50 of the fifth embodiment is modified. Otherwise, it is the same as the damper 50. The flexible portion 71 of this damper 70 has a cylindrical protrusion 71a as a "mounting protrusion" protruding from the central summit portion thereof along the cylinder axis of the peripheral wall portion 11.

It is to be noted that in the fifth embodiment, the flexible portion 12 has the mounting recess 12a extending into the container main body. In many cases, this mounting recess 12a is provided for the purpose of agitating the viscous fluid 14 to thereby achieve a vibration damping effect. It is preferably applied, in particular, to the vibration prevention for the mechanical chassis of a reproduction device to which strong disturbance vibration in all directions is likely to be applied during use, as in the case of an automotive CD drive. However, in the case, for example, of vibration prevention for the mechanical chassis of a reproduction device like a CD-ROM drive mounted in a notebook type personal computer, to which such strong disturbance vibration in all directions, as in the case of an automotive device, is not likely to be applied during use and which is particularly subject to vibration in the lateral direction (horizontal direction), it is more advantageous to give higher priority to a reduction in the height of the damper as measured from the lid portion to the summit portion of the flexible portion, thus contributing to a reduction in the thickness of the reproduction device.

In view of this, in the damper 70 of this embodiment, the cylindrical protrusion 71a is used instead of the mounting recess 12a. As a result, the filling amount of the viscous fluid 14 is made larger, thereby obtaining the requisite damping performance. Further, the root portion of the outer peripheral surface of the cylindrical protrusion 71a is somewhat spaced apart from the bottom plate 2b of the casing 2, and the flexible portion 71 is not in direct contact with the bottom plate 2b, so that it is possible to prevent the flexible portion 71 of the damper 70 from coming into contact with the bottom plate 2b to be worn out.

In the bottom plate 2b of the casing 2 as the "structure member," there is formed an annular recess 2f as the "protrusion receiving portion" of a configuration corresponding to the cylindrical protrusion 71a. When the cylindrical protrusion 71a is inserted and fitted into the annular recess 2f, the damper 70 is fixed to the bottom plate 2b.

Eighth Embodiment

Figure 9A:
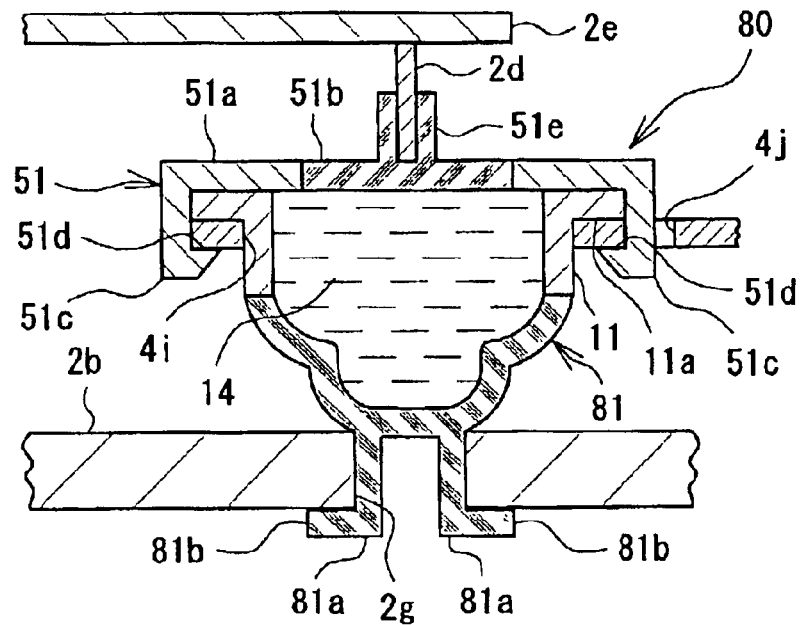
Figure 9B:
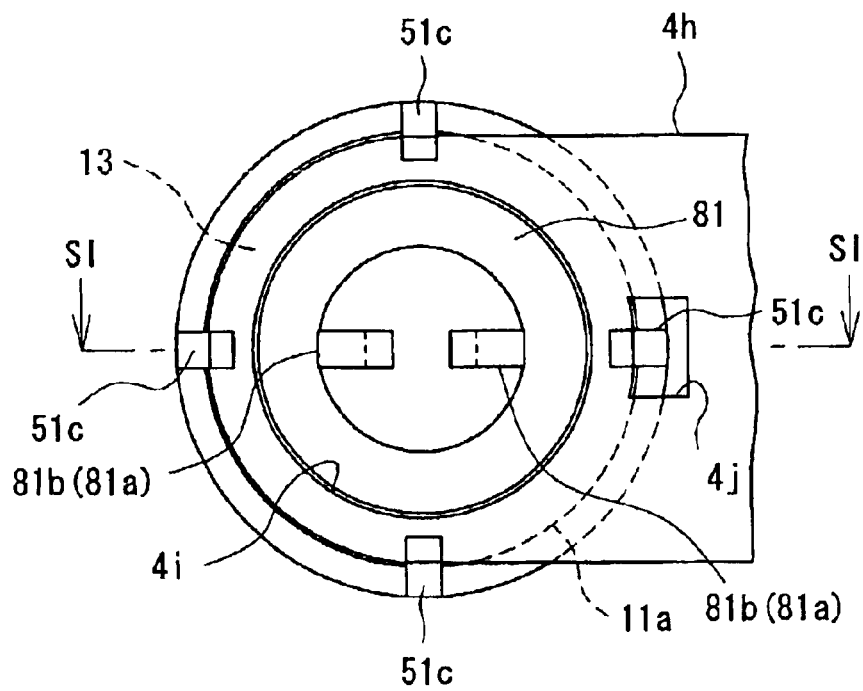

A damper 80 according to an eighth embodiment of the present invention will now be described with reference to FIGS. 9A and 9B of the drawings. In the damper 80, the flexible portion 71 of the damper 70, of the seventh embodiment is modified.

The flexible portion 81 of the damper 80 is equipped with two elastic lock members 81a as "mounting protrusions" outwardly protruding in a cantilever-like fashion along the cylinder axis direction of the peripheral wall portion 11. Formed at the forward ends of the two elastic lock members 81a are claw portions 81b to be engaged with that surface of the bottom plate 2b of the casing 2 which is on the side opposite to the surface facing the damper 80 (i.e., the front surface of the casing 2). There is no limitation regarding the number of elastic lock members 81a as long as their formation is possible.

In the bottom plate 2b of the casing 2 as the "structure member," there is formed a mounting hole 2g as a "protrusion receiving portion." When the two elastic lock members 81a are inserted into the mounting hole 2g in a state in which they are inwardly deflected so as to be brought close to each other, the claw portions 81b are engaged with the hole edge of the mounting hole 2g on the surface of the casing, whereby the damper 80 is fixed to the bottom plate 2b.

As in the case of the damper 70 of the seventh embodiment, the damper 80 provides an arrangement in which it is possible to contribute to a further reduction in the thickness of the reproduction device. Further, the fixation of the flexible portion 81 to the bottom plate 2b is made more reliable. Moreover, since the claw portions 81b are engaged with the surface of the casing 2, it is possible to reduce the internal space of the casing 2 occupied by the damper 80 while effecting reliable fixation.

Ninth Embodiment

Figure 10A:
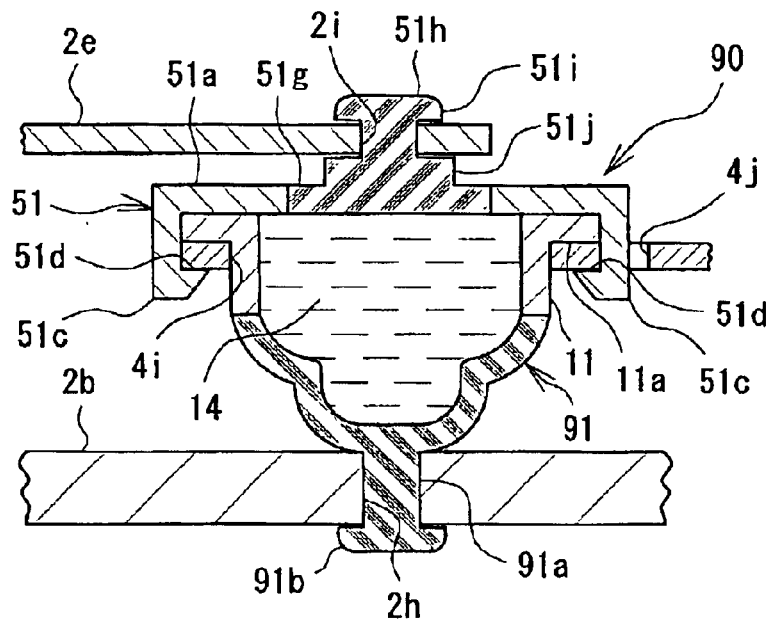
Figure 10B:
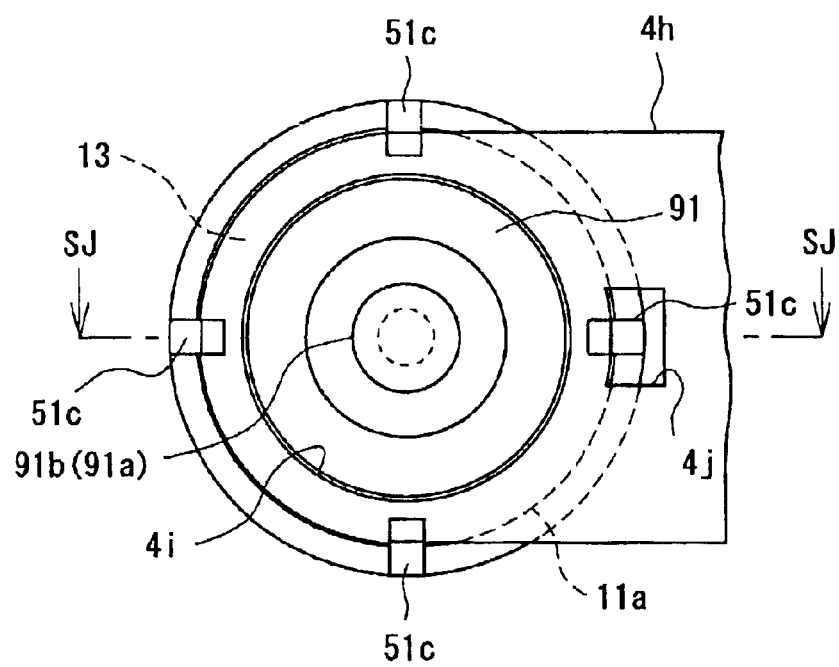

A damper 90 according to a ninth embodiment of the present invention will now be described with reference to FIGS. 10A and 10B of the drawings. In the damper 90, the flexible portion 81 and the inner peripheral portion 51b of the lid portion 51 of the eighth embodiment are modified. Specifically, the flexible portion 91 of the damper 90 is equipped with a mounting shaft portion 91a as the "mounting protrusion" outwardly protruding in a cantilever-like fashion along the cylinder axis of the peripheral wall portion 11. A head portion 91b is formed at the forward end of the mounting shaft portion 91a. The head portion 91b is adapted to be engaged with that surface of the bottom plate 2b of the casing 2 which is on the side opposite to the surface opposing the damper 90 (i.e., the front surface of the casing 2).

Further, provided on the inner peripheral portion 51g of the lid portion 51 of the damper 90 is a mounting shaft portion 51h as a "mounting protrusion" protruding outwardly in a cantilever-like fashion along the cylinder axis direction of the peripheral wall portion 11. A head portion 51i is formed at the forward end of the mounting shaft portion 51h. The head portion 51i is adapted to be engaged with that surface of the bracket 2e which is on the side opposite to the surface opposing the damper 90 (i.e., the upper surface of the bracket as seen in the drawing). Further, formed at the base end thereof is a base portion 51j adapted to hold the bracket 2e between it and the head portion 51i from the side of the opposing surface of the damper 90.

A mounting hole 2h as a "protrusion receiving portion" extends through the bottom plate 2b of the casing 2 as a "structure member." When the mounting shaft portion 91a is forced into the mounting hole 2h, the head portion 91b with a large diameter is engaged with the hole edge of the mounting hole 2h on the surface of the casing 2, and the damper 90 is fixed to the bottom plate 2b. Further, a mounting hole 2i as a "protrusion receiving portion" extends through the bracket 2e as a "structure member." When the mounting shaft portion 51h is forced into the mounting hole 2i, the head portion 51i with a large diameter is engaged with the hole edge of the mounting hole 2i on the upper surface of the bracket 2e as seen in the drawing, and the damper 90 is fixed to the bracket 2e.

In the ninth embodiment, as in the eighth embodiment, it is possible to contribute to a further reduction in the thickness of the reproduction device, and the fixation of the flexible portion 91 is reliable, making it possible to reduce the space of the casing 2 occupied by the damper 90 while effecting reliable fixation. Further, since the bracket 2e is fixed in position while being held between the head portion 51i and the base portion 51j, the fixation of the lid portion 51 to the bracket 2e is also reliable. Further, since the bracket 2e is spaced apart from the lid portion 51 by the base portion 51j, the clearance formed by the protruding of the base portion 51j helps to restrain contact of the bracket 2e with the lid portion 51.

Next, specific examples of the damper of the present invention and the mounting structure thereof (the vibration proof structure for a mechanical chassis) will be described.

EXAMPLE 1

Example 1 corresponds to the damper 10 of the above-described first embodiment and the mounting structure thereof. In Example 1, two-color molding was performed with polypropylene resin and styrene-based thermoplastic elastomer to prepare a peripheral wall portion 11 and a flexible portion 12 thermally fused to each other. Further, two-color molding was performed with polypropylene resin and styrene-based thermoplastic elastomer to prepare a lid portion 13 having an outer peripheral portion 13a and an inner peripheral portion 13b thermally fused to each other. A viscous fluid 14 was poured into the interior of the peripheral wall portion 11 and the flexible portion 12, and then the outer peripheral portion 13a of the lid portion 13 and the outwardly directed flange 11a of the peripheral wall portion 11 were fused together by ultrasonic welding for hermeticity to thereby obtain a damper 10. The maximum outer diameter of this damper 10 (the diameter of the lid portion 13) is φ9 mm, and the total height thereof (the length of the end portion of the lid portion 13 and the end portion of the flexible portion 12, as measured along the cylinder axis direction of the peripheral wall portion 11) is 5.8 mm.

The styrene-based thermoplastic elastomer of the flexible portion 12 was one with a hardness of 30 degrees (JIS K6253, Type A), a compression set of 30%, and a loss factor tan δ of 0.20. The thickness of the flexible portion 12 was fixed to 0.3 mm. As the viscous fluid 14, a silicone grease having a rotation viscosity of 1.2 m²/s was used. The styrene-based thermoplastic elastomer of the lid portion 13 was one with a hardness of 50 degrees (JIS K6253, Type A), a compression set of 30%, and a loss factor tan δ of 0.20.

EXAMPLE 2

Example 2 corresponds to the above-described damper 40 of the fourth embodiment and the mounting structure thereof. The damper 40 of Example 2 only differs from the damper 10 of Example 1 in the formation of the detent protrusions 41b on the peripheral wall portion 41 and the mounting structure. Otherwise, it is the same as Example 1. The maximum outer diameter of the damper 40 (the diameter of the lid portion 13 is φ9 mm, and the total height thereof (the distance between the end portion of the lid portion 13 and the end portion of the flexible portion 12, as measured along the cylinder axis direction of the peripheral wall portion 41) is 5.8 mm.

EXAMPLE 3

Example 3 corresponds to the above-described damper 50 of the fifth embodiment and the mounting structure thereof. The damper 50 of Example 3 only differs from the damper 10 of Example 1 in the formation of the lock member 51c and the mounting structure. Otherwise, it is the same as Example 1. The maximum outer diameter of the damper 50 (the diameter of the lid portion 51) is φ10.5 mm, and the total height thereof (the distance between the end portion of the lid portion 51 and the end portion of the flexible portion 12, as measured along the cylinder axis direction of the peripheral wall portion 11) is 5.8 mm.

EXAMPLE 4

Example 4 corresponds to the above-described damper 70 of the seventh embodiment and the mounting structure thereof. The damper 70 of Example 4 only differs from the damper 50 of Example 3 in the formation of the cylindrical protrusion 71a on the flexible portion 71, in that the filling amount of the silicone grease as the viscous fluid 14 is large, and in the mounting structure. Otherwise, it is the same as Example 3. The maximum outer diameter of the damper 70 (the diameter of the lid portion 51) is φ10.5 mm, and the total height thereof (the distance between the end portion of the lid portion 51 and the end portion of the flexible portion 71, as measured along the cylinder axis direction of the peripheral wall portion 11) is 7.3 mm.

EXAMPLE 5

Example 5 corresponds to the above-described damper 80 of the eighth embodiment and the mounting structure thereof. The damper 80 of Example 5 differs from the damper 50 of Example 3 only in the formation of the claw portion 81b on the flexible portion 81, in that the filling amount of the silicone grease as the viscous fluid 14 is large, and in the mounting structure. Otherwise, it is the same as Example 3. The maximum outer diameter of the damper 80 (the diameter of the lid portion 51) is φ10.5 mm, and the total height thereof (the distance between the end portion of the lid portion 51 and the end portion of the flexible portion 81, as measured along the cylinder axis direction of the peripheral wall portion 11) is 9.5 mm.

EXAMPLE 6

Example 6 corresponds to the above-described damper 90 of the ninth embodiment and the mounting structure thereof. The damper 90 of Example 6 differs from the damper 50 of Example 3 only in the formation of the mounting shaft portion 91a on the flexible portion 91, in the formation of the mounting shaft portion 51h on the inner peripheral portion 51g of the lid portion 51, in that the filling amount of the silicone grease as the viscous fluid 14 is large, and in the mounting structure. Otherwise, it is the same as Example 3. The maximum outer diameter of the damper 90 (the diameter of the lid portion 51) is φ10.5 mm, and the total height thereof (the distance between the end portion of the lid portion 51 and the end portion of the flexible portion 91, as measured along the cylinder axis direction of the peripheral wall portion 11) is 11.0 mm.

COMPARATIVE EXAMPLE 1

Figure 11A:
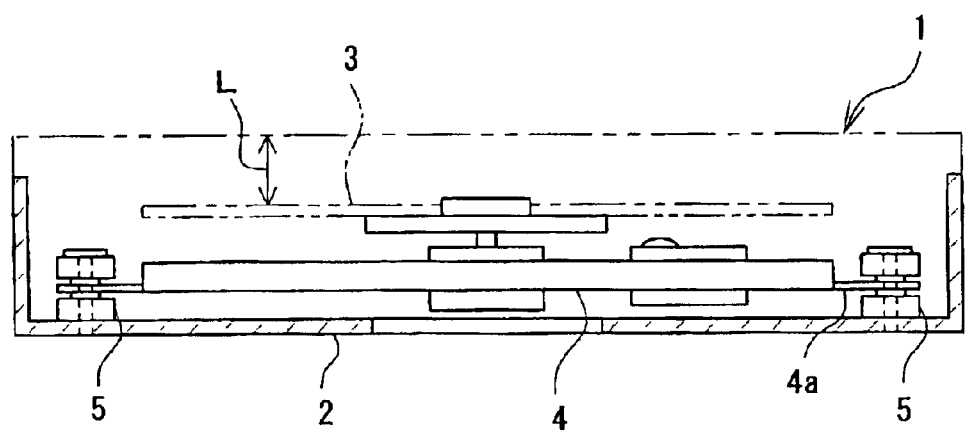
Figure 11B:
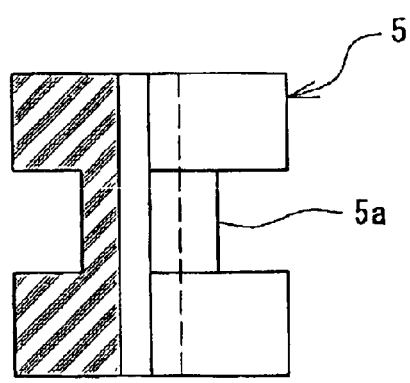

Comparative Example 1 corresponds to the insulator type damper 5 shown in FIGS. 11A and 11B, and the mounting structure thereof. Comparative Example 1 uses a styrene-based thermoplastic elastomer having a hardness of 30 degrees (JIS K6253, Type A) as the material. The maximum outer diameter of the damper 5 is φ8.0 mm, and its total height is 4.5 mm.

COMPARATIVE EXAMPLE 2

Figure 12A:
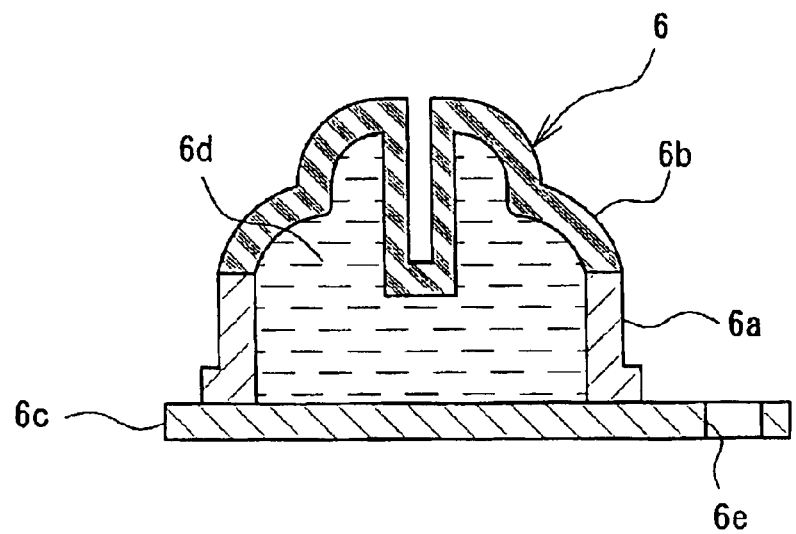
Figure 12B:
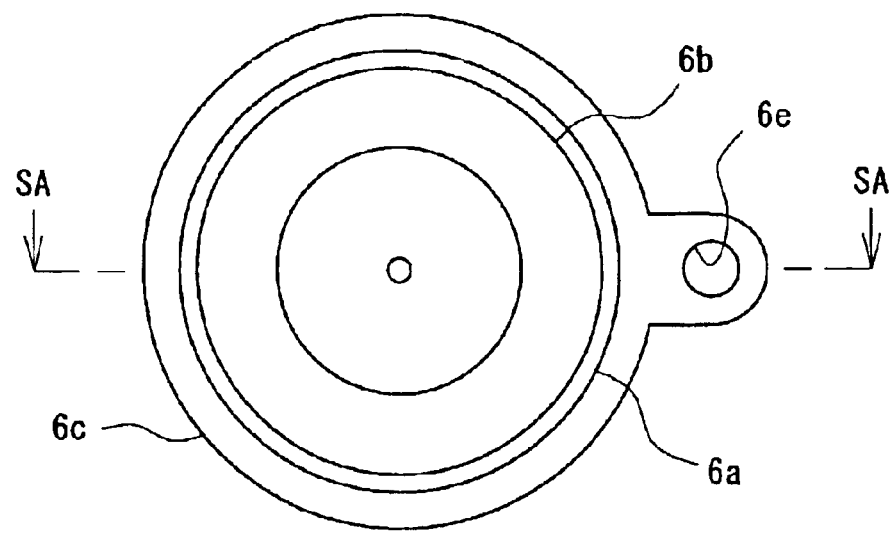
Figure 13A:
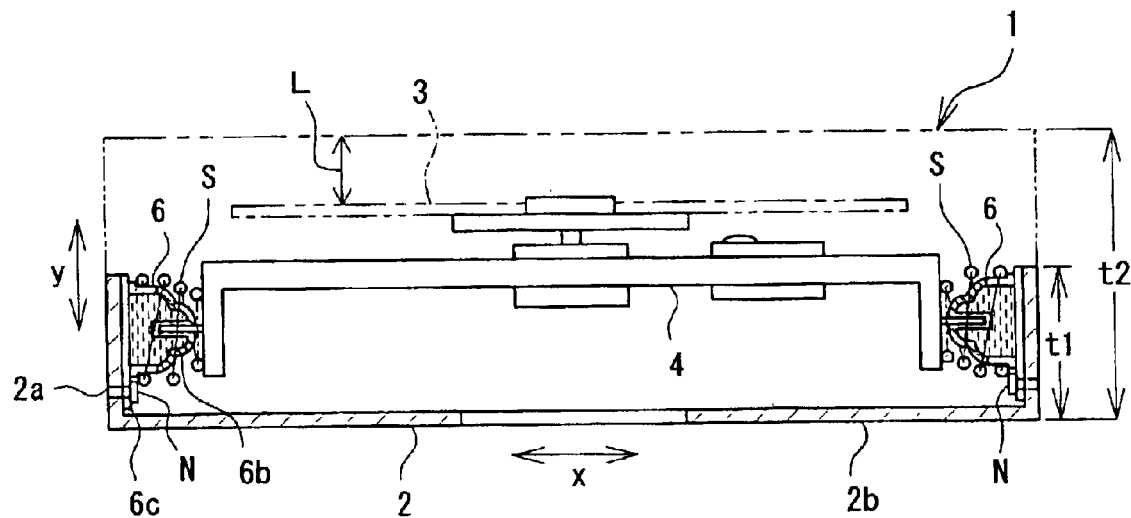

Comparative Example 2 corresponds to the damper 6 shown in FIGS. 12A and 12B, and the mounting structure shown in FIG. 13A. In Comparative Example 2, two-color molding was performed with a polypropylene resin and a styrene-based thermoplastic elastomer to prepare a peripheral wall portion 6a and a flexible portion 6b thermally fused to each other. Further, a lid portion 6c solely consisting of a polypropylene resin was prepared. After pouring a viscous fluid 6d into the interior of the peripheral wall portion 6a and the flexible portion 6b, the lid portion 6c and the peripheral wall portion 6a were fused together by ultrasonic welding for hermeticity to thereby obtain the damper 6. The hardness, compression set, loss factor tan δ, and thickness are the same as those of Example 1, and the viscous fluid 6d is also the same as the one used in Example 1. The maximum outer diameter of the damper 6 (the diameter of the circular portion of the lid portion 6c) is φ10.0 mm, and its total height is 4.5 mm.

COMPARATIVE EXAMPLE 3

Figure 13B:
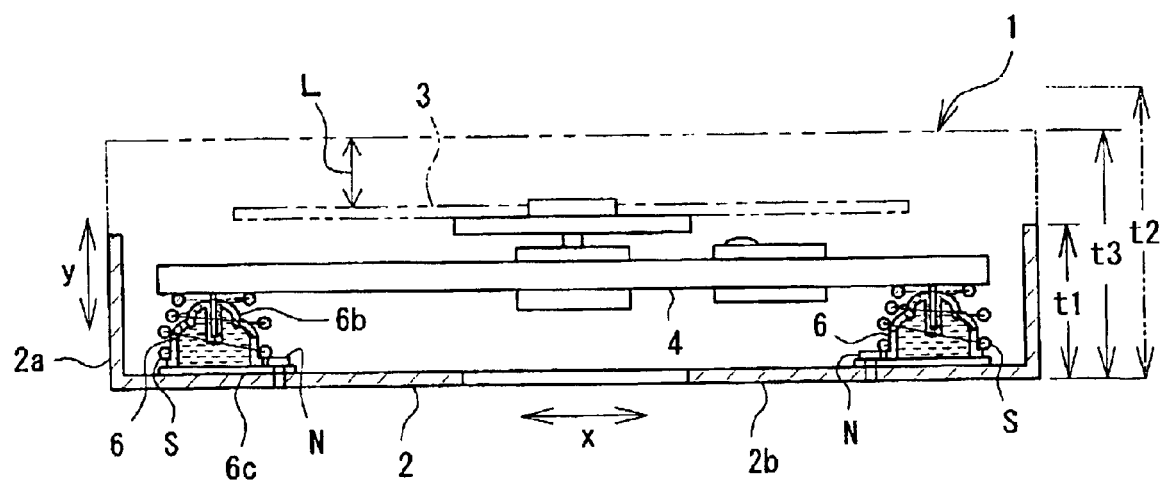

Comparative Example 3 corresponds to the damper 6 shown, in FIGS. 12A and 12B, and the mounting structure shown in FIG. 13B. Thus, the damper 6 is the same as that of Comparative Example 2.

Evaluation tests were conducted on Examples 1 through 6 and Comparative Examples 1 through 3 as follows:

A vibration test was conducted on Examples 1 through 6, with the damper 10, 40, 50, 70, 80, 90 being mounted on the reproduction device 1 by using the mounting structure as shown in FIGS. 2A and 2B (in the case of Examples 4 through 6, mounting structures modified accordingly). Specifically, the reproduction device 1 consists of a CD-RW drive for a notebook type personal computer. The weight of the mechanical chassis 4 is 70 g, and three mounting portions 4b, 4d, 4h are provided thereon. Further, the mechanical chassis 4 is also supported by three identical coil springs S mounted so as to surround the dampers 10, 40, 50, 70, 80, 90. The dampers 5, 6 of Comparative Examples 1 through 3 were mounted to the reproduction device 1 by the mounting structures as shown in FIGS. 11A, 13A, and 13B, respectively.

Each reproduction device 1 of Examples 1 through 6 and Comparative Examples 1 through 3 was fixed to a vibration table (not shown), and vibrated in the vertical direction y and the horizontal direction x at a fixed acceleration of 5 m/s$^2$ within a frequency range of 10 to 500 Hz to measure the ratio of vibration transmission to the mechanical chassis 4. Further, the displacement of the mechanical chassis 4 was measured by a displacement gauge. Regarding the resonance magnification, the vibration output acceleration a2 from the mechanical chassis 4 was measured with respect to the vibration input acceleration a1 from the vibration table at the resonance frequency, and was converted by using the relational formula: 20 Log(a2/a1). Further, the reproduction device 1 was actually operated to measure the vibration leakage to the outside during high speed rotation (9600 rpm) by using a G sensor. Further, the requisite time for mounting each damper 10, 40, 50, 70, 80, 90, 5, 6 to the mechanical chassis 4 was measured. The total height as measured along the transverse direction y of the finally obtained reproduction device 1 was measured. The test results are given in the following table.

TABLE 1

|  | Vertical direction | | Horizontal direction | | | | Total | Damper |
| --- | --- | --- | --- | --- | --- | --- | --- | --- |
|  | Resonance frequency (Hz) | Resonance magnification (dB) | Resonance frequency (Hz) | Resonance magnification (dB) | Displacement amount (mm) | Vibration leakage (G) | device height (mm) | mounting time (s) |
| Example 1 | 47 | 3.2 | 32 | 3.8 | 0.6 | 0.3 | 12.7 | 15 |
| Example 2 | 47 | 3.2 | 32 | 3.8 | 0.6 | 0.3 | 12.7 | 5 |
| Example 3 | 47 | 3.2 | 32 | 3.8 | 0.6 | 0.3 | 12.7 | 3 |
| Example 4 | 47 | 2.7 | 32 | 3.3 | 0.5 | 0.3 | 11.0 | 8 |
| Example 5 | 47 | 2.7 | 32 | 3.3 | 0.5 | 0.3 | 11.0 | 10 |
| Example 6 | 47 | 2.7 | 32 | 3.3 | 0.5 | 0.3 | 11.0 | 15 |
| Comparative Example 1 | 85 | 6.8 | 48 | 5.2 | 0.5 | 1 | 12.7 | 12 |
| Comparative Example 2 | 40 | 3.2 | 38 | 3.8 | 0.6 | 0.4 | 22.5 | 15 |
| Comparative Example 3 | 53 | 7.2 | 42 | 5.8 | 1.1 | 1 | 17.5 | 10 |

The test results show that, as compared with Comparative Example 1, Examples 1 through 6 make it possible to restrain the resonance frequency and resonance magnification to a lower level in both the vertical direction y and the horizontal direction x, thus providing a satisfactory vibration damping characteristic. Further, the vibration leakage value G is also low. While Comparative Example 2 provides a satisfactory vibration damping characteristic like Examples 1 through 6, it involves an excessively large total height of the device, so that it cannot be applied to a thin type reproduction device. Comparative Example 3 involves a total device height larger than that of Examples 1 through 6, and cannot be applied to a device with a further reduced thickness. Of Examples 1 through 6, Example 3 involves the least damper mounting time, and is superior in mounting operability. Further, as compared to the other examples, Examples 4 through 6 allow a reduction of the device total height.

INDUSTRIAL APPLICABILITY

According to one aspect of the present invention, each of the flexible portion and the lid portion is provided with either a mounting protrusion or a protrusion receiving portion into which a mounting protrusion is inserted, thus forming a fixation structure with respect to a structure member they face. The container main body is equipped with a mounting means with respect to the mechanical chassis. Each of the flexible portion and the lid portion of the damper is fixed to the structure member so as to support the damper in a floating state. The flexible portion of the damper and the structure member are fixed to each other by a mounting protrusion provided on one of them and a protrusion receiving portion provided in the other of them. The lid portion of the damper and the structure member are fixed to each other by a mounting protrusion provided on one of them and a protrusion receiving portion provided in the other of them. As a result of this construction, there is no need to mount the damper such that the lid portion thereof faces the casing, as in the case of the conventional damper, so that it is possible to meet the requirement for a further reduction in thickness in the transverse direction (thickness direction) of the reproduction device, and the degree of freedom in designing the casing can be increased. Further, since the damper is fixed to the mechanical chassis so as to be supported in a floating state with respect to the structure member, it is possible to obtain a superior vibration damping effect whether the reproduction device is used in the vertical or the horizontal position.

According to another aspect of the present invention, the damper is mounted in overlapping relationship with the thickness of the mechanical chassis. The peripheral wall portion of the damper is inserted into a mounting hole formed in the mechanical chassis. And, the damper is mounted in overlapping relationship with the thickness of the mechanical chassis. As a result, it is possible to meet the requirement for a further reduction in the thickness of a reproduction device.

According to another aspect of the present invention, the central portion of the lid portion, including the portion where a mounting protrusion or a protrusion receiving portion is formed, is formed of a rubber-like elastic material. As a result, not only the flexible portion but also the central portion of the lid portion formed of a rubberlike elastic material functions as an elastic membrane to damp vibration, thus further enhancing its effect. Further, when inserting the mounting protrusion into the protrusion receiving portion, it is possible to deform, in addition to the flexible portion, the central portion of the lid portion, so that the operation of inserting the mounting protrusion into the protrusion receiving portion is facilitated.

According to another aspect of the present invention, the container main body is provided, as a mounting means, with a lock protrusion adapted to lock the mechanical chassis. An outwardly directed lock protrusion protrudes from the container main body, and the lock protrusion is engaged with the hole edge of a mounting hole of the mechanical chassis. As a result, the operation of fixing the damper to the mechanical chassis is facilitated.

According to another aspect of the present invention, the container main body is provided, as a mounting means, with a lock member adapted to lock the other surface of the mechanical chassis on the side opposite to one surface thereof that the lock protrusion locks, holding the mechanical chassis on the front and back sides together with the lock protrusion. A lock member adapted to lock the other surface of the mechanical chassis on the side opposite to the one surface thereof that the lock protrusion locks protrudes from the container main body, thereby mounting the damper to the mechanical chassis while holding the mechanical chassis on the front and back sides by the lock protrusion and the lock member. As a result, the operation of fixing the damper to the mechanical chassis is facilitated, and it is possible to consolidate the fixation.

According to another aspect of the present invention, the container main body is equipped with a detent protrusion for effecting locking from the thickness direction of the mechanical chassis. A cutout portion enlarging the hole edge is provided in the mounting hole of the mechanical chassis. The container main body is equipped with a detent protrusion for effecting locking in the circumferential direction of the mounting hole with respect to the cutout portion. A through-hole is provided in the mechanical chassis, and the container main body is equipped with a detent protrusion for effecting locking from the thickness direction of the mechanical chassis with respect to the through-hole. As a result, the damper does not rotate within the mounting hole of the mechanical chassis even if it receives vibration, thereby stabilizing the mounting state.

While the invention has been specifically described in connection with specific embodiments thereof, it is to be understood that this is by way of illustration and not of limitation, and the scope of the appended claims should be contained as broadly as the prior art will permit.

What is claimed is:

1. A damper comprising:
a container main body having a peripheral wall portion, a flexible portion, and a lid portion, wherein:
said peripheral wall portion is coupled to said flexible portion,
said flexible portion is structurally adapted to engage a flexible portion mounting shaft member, and
said lid portion has an outer peripheral portion coupled to an inner peripheral portion, said outer peripheral portion being at the perimeter of said lid portion and coupled to said peripheral wall portion, said inner peripheral portion being adapted to engage a lid portion mounting shaft member, and said outer peripheral portion being of a material different than said inner peripheral portion.

2. The damper according to claim 1, wherein said peripheral wall portion, said flexible portion, and said lid portion defines an inner space, a damping medium being contained within said inner space.

3. The damper according to claim 2, wherein said damping medium is a liquid viscous fluid.

4. The damper according to claim 1, wherein paid flexible portion encloses a first end of said peripheral wall portion and said lid portion enloses a second end of said peripheral wall portion.

5. The damper according to claim 1, wherein said flexible portion includes a flexible portion mounting recess, said flexible portion mounting recess being structurally adapted to receive said flexible portion mounting shaft member.

6. The damper according to claim 1, wherein said flexible portion is seamless with said flexible portion mounting shaft member.

7. The damper according to claim 1, wherein said inner peripheral portion includes a lid portion mounting recess, said lid portion mounting recess being structurally adapted to receive said lid portion mounting shaft member.

8. The damper according to claim 1, wherein said lid portion is seamless with said lid portion mounting shaft member.

9. The damper according to claim 1, wherein said peripheral wall portion is of a material different than said flexible portion.

10. The damper according to claim 1, wherein said peripheral wall portion is formed of hard resin.

11. The damper according to claim 1, wherein said flexible portion is formed of a rubber-like elastic material.

12. The damper according to claim 1, wherein said outer peripheral portion is formed of hard resin.

13. The damper according to claim 1, wherein said inner peripheral portion is formed of a rubber-like elastic material.

14. A vibration proof structure for a mechanical chassis, comprising the damper of claim 1.

15. A vibration proof structure for a mechanical chassis, comprising:
a mechanical chassis; a casing; and at least one damper, wherein:
said mechanical chassis supports a reading mechanism, said reading mechanism being adapted to read data recorded on a recording medium,
said casing has a flexible portion structure member and a lid portion structure member,
said flexible portion structure member engaging one end of a flexible portion mounting shaft member, and
said lid portion structure member engaging one end of a lid portion mounting shaft member, and
said damper includes a container main body having a peripheral wall portion, a flexible portion, and a lid portion,
said peripheral wall portion being coupled to said flexible portion,
said flexible portion structure member engaging another end of said flexible portion mounting shaft member,
said lid portion having an outer peripheral portion coupled to an inner peripheral portion, said outer peripheral portion being at the perimeter of said lid portion and coupled to said peripheral wall portion, said inner peripheral portion engaging another end of said lid portion mounting shaft member, and said outer peripheral portion being of a material different than said inner peripheral portion, and
said damper being adapted to dampen vibration of said mechanical chassis relative to said casing.

16. The vibration proof structure according to claim 15, wherein of said mechanical chassis has a mounting hole, said mounting hole having a main hole portion extending through said mechanical chassis.

17. The vibration proof structure according to claim 16, wherein said peripheral wall portion includes a flange, said damper being affixed within said main hole portion, said flange abutting said mechanical chassis.

18. The vibration proof structure according to claim 16, wherein said mounting hole has a cutout portion extending through said mechanical chassis,
said cutout portion being adjacent said main hole portion, and
said peripheral wall portion being coupled to a detent protrusion, said detent protrusion effecting locking in a circumferential direction of the mounting hole with respect to said cutout portion.

19. The vibration proof structure according to claim 15, wherein said flexible portion structure member is separate from said mechanical chassis.

20. The vibration proof structure according to claim 15, wherein said lid portion structure member is separate from said mechanical chassis.

21. The vibration proof structure according to claim 15, wherein said flexible portion mounting shaft member protrudes from said structure member.

22. The vibration proof structure according to claim 15, wherein a mounting recess within said flexible portion receives another end of said flexible portion mounting shaft.

23. The vibration proof structure according to claim 15, wherein said flexible portion is seamless with said flexible portion mounting shaft member.

24. The vibration proof structure according to claim 15, wherein said lid portion mounting shaft protrudes from said structure member.

25. The vibration proof structure according to claim 15, wherein a mounting recess within said inner peripheral portion receives another end of said lid portion mounting shaft.

26. The vibration proof structure according to claim 15, wherein said lid portion is seamless with said lid portion mounting shaft member.

* * * * *